(12) United States Patent
Landig et al.

(10) Patent No.: US 11,189,258 B2
(45) Date of Patent: Nov. 30, 2021

(54) NANOVOIDED POLYMER FOR TUNABLE ACOUSTIC DAMPING

(71) Applicant: Facebook Technologies, LLC, Menlo Park, CA (US)

(72) Inventors: Renate Eva Klementine Landig, Seattle, WA (US); Kenneth Diest, Kirkland, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 67 days.

(21) Appl. No.: 16/735,454

(22) Filed: Jan. 6, 2020

(65) Prior Publication Data

US 2020/0227020 A1     Jul. 16, 2020

Related U.S. Application Data

(60) Provisional application No. 62/790,549, filed on Jan. 10, 2019, provisional application No. 62/808,471, filed on Feb. 21, 2019.

(51) Int. Cl.
    *G10K 11/165*        (2006.01)
    *G10K 11/178*        (2006.01)

(52) U.S. Cl.
    CPC ........ *G10K 11/165* (2013.01); *G10K 11/1785* (2018.01)

(58) Field of Classification Search
    CPC .......................... G10K 11/165; G10K 11/1785
    See application file for complete search history.

(56) References Cited

U.S. PATENT DOCUMENTS

| | | | |
|---|---|---|---|
| 6,958,860 B2 * | 10/2005 | Dontula | G02B 5/0221 359/518 |
| 7,037,268 B1 * | 5/2006 | Sleva | B06B 1/0688 340/855.6 |
| 2020/0224745 A1 | 7/2020 | Landig et al. | |

FOREIGN PATENT DOCUMENTS

| | | |
|---|---|---|
| KR | 10-0786645 B1 | 12/2007 |
| WO | 2020/146593 A1 | 7/2020 |

OTHER PUBLICATIONS

Hamdi et al., "Piezoelectric cellular polymer films: Fabrication, properties and applications", Sep. 3, 2018 (Year: 2018).*

Invitation to Pay Additional Fees received for PCT Application Serial No. PCT/US2020/012878 dated Apr. 29, 2020, 24 pages.

Sappati et al., "Piezoelectric Polymer and Paper Substrates: A Review", Sensors, vol. 18, No. 11, Article 3605, Oct. 24, 2018, pp. 1-30.

(Continued)

*Primary Examiner* — David L Ton
(74) *Attorney, Agent, or Firm* — FisherBroyles, LLP

(57) ABSTRACT

An acoustic element includes a nanovoided polymer layer having a first nanovoid topology in an unactuated state and a second nanovoid topology different than the first nanovoid topology in an actuated state. Capacitive actuation of the nanovoided polymer layer, for instance, can be used to reversibly control the size and shape of the nanovoids within the polymer layer and hence tune its sound damping characteristics or sound transduction behavior, e.g., during operation of the acoustic element. An acoustic element may be configured for passive or active sound attenuation. Various other apparatuses, systems, materials, and methods are also disclosed.

20 Claims, 13 Drawing Sheets

(56) References Cited

OTHER PUBLICATIONS

Ramadan et al., "A review of piezoelectric polymers as functional materials for electromechanical transducers", Smart Materials and Structures, vol. 23, No. 3, Article 033001, Jan. 20, 2014, pp. 1-26.
Fukada et al., "Recent Trend on Application of Piezoactve Polymers to Acoustics", Materials Technology, Advances Performance Materials, vol. 19, No. 2, 2004, pp. 83-90.
International Search Report and Written Opinion received for PCT Application Serial No. PCT/US2020/012878 dated Jun. 25, 2020, 22 pages.
Arenas et al., "Recent Trends in Porous Sound-Absorbing Materials", Sound&Vibration, Jul. 2010, pp. 12-17.
Malakooti et al., "Sound insulation properties in low-density, mechanically strong and ductile nanoporous polyurea aerogels", ScienceDirect, Journal of Non-Crystalline Solids, vol. 476, 2017, pp. 36-45.
Karniadakis et al., "Microflows and Nanoflows: Fundamentals and Simulation", Springer, 2005, 6 pages.
Sperling, L. H., "Sound and Vibration Damping with Polymers", Chapter 1, Basic Viscoelastic Definitions and Concepts, 1990, pp. 5-22.
Seo et al., "Reticulated Nanoporous Polymers by Controlled Polymerization-Induced Microphase Separation", Science, vol. 336, Jun. 15, 2012, pp. 1422-1425.
Halosonic, "Active Noise Management Solutions", http://www.halosonic.co.uk/, as accessed on Jan. 2019, pp. 1-8.
Aerogel Technologies, "Airloy Ultramaterials", URL: http://www.airloy.com/category/performance, 2011, pp. 1-3.
Dong et al., "Acoustic properties of Organic/Inorganic Composite Aerogels", URL: https://www.researchgate.net/publication/264892346, MRS Online Proceeding Library Archive, Jan. 2011, 11 pages.
Ricciardi et al., "Multilayer Absorbers of Silica Aerogel", URL: http://www.sea-acustica.es/fileadmin/publicaciones/Sevilla02_mat01011.pdf, Proceedings of Forum Acusticum, 2002, 6 pages.
Karsten et al., "Active suspension with multilayer dielectric elastomer actuator", Proc, of SPIE, vol. 7976, Mar. 28, 2011, pp. 1-3.
Karsten et al., "Investigation of an Applicability of Dielectric Elastomer Actuators (DEA) for Active Vibration Attenuation of Planar Structures", AIA-DAGA, 2013, pp. 1379-1382.
Zhao et al., "An application review of dielectric electroactive polymer actuators in acoustics and vibration control", Journal of Physics: Conference Series, vol. 744, 2016, 9 pages.
Rustighi et al., "Experimental Characterisation of a Flat Dielectric Elastomer Loudspeaker", Actuators, vol. 7, No. 28, Jun. 11, 2018, pp. 1-14.

* cited by examiner

NANOVOIDED POLYMER FOR TUNABLE ACOUSTIC DAMPING

CROSS-REFERENCE TO RELATED APPLICATIONS

This application claims the benefit of priority under 35 U.S.C. § 119(e) of U.S. Provisional Application No. 62/790,549, filed Jan. 10, 2019, and U.S. Provisional Application No. 62/808,471, filed Feb. 21, 2019, the contents of which are incorporated herein by reference in their entirety.

BACKGROUND

Sound damping or acoustic attenuation materials may be used to reduce or eliminate undesired sound transmission through an article or space. While it is generally recognized that sound transmission loss is proportional to the density of a sound damping material, for many applications it is desirable to incorporate a sound damping material without appreciably increasing the overall weight of the host article. Furthermore, it would be desirable in a variety of applications to achieve sound damping (i.e., an increased sound transmission loss) over a range of frequencies, e.g., at frequencies less than approximately 1000 Hz, where the realization of effective sound attenuation may be more challenging.

Low density ($\rho<1.2$ g/cm$^3$) polymer materials may be incorporated into a variety of devices, including optic and electro-optic architectures, such as active and passive optics and electroactive devices. Polymer materials such as electroactive polymer (EAP) materials, for instance, may change their shape under the influence of an electric field. EAP materials have been investigated for use in various technologies, including actuation, sensing and/or energy harvesting. Lightweight and conformable, electroactive polymers may be incorporated into wearable devices such as haptic devices and are attractive candidates for emerging technologies.

A variety of applications may leverage one or more attributes of thin film polymer materials, including their electrical, mechanical, and/or optical properties. Notwithstanding recent developments, it would be advantageous to provide polymer or other low-density materials having improved attributes, including dynamic, tunable sound attenuation properties.

SUMMARY

As will be described in greater detail below, the instant disclosure relates generally to acoustic materials and more specifically to nanovoided polymer-containing acoustic insulators and transducers. The nanovoided polymer materials may include electroactive materials, such as dielectric elastomers suitable for use in electroactive devices including, for example, polydimethylsiloxane (PDMS)-based polymers or polyvinylidene fluoride (PVDF)-based polymers. Actuation of the nanovoided polymer materials may be used to reversibly control the size and shape of nanovoids within the polymer matrix and thereby modify the damping or transduction properties of the nanovoided polymer layer. In certain embodiments, the disclosure relates to switchable acoustic elements where the void size and/or the void size distribution of the nanovoided polymer may be reversibly tuned during operation thereof.

According to some embodiments, an acoustic element may include a layer of a nanovoided polymer where the nanovoided polymer has a first nanovoid topology in a first (e.g., unactuated) state and a second nanovoid topology different from the first nanovoid topology in a second (e.g., actuated) state. The nanovoided polymer may be capacitively actuated, for example, or actuated mechanically or acoustically.

According to some embodiments, an acoustic element may include a primary electrode, a secondary electrode overlapping at least a portion of the primary electrode, and a nanovoided polymer layer disposed between and abutting the primary electrode and the secondary electrode, where the nanovoided polymer layer has a first nanovoid topology when a first voltage is applied between the primary electrode and the secondary electrode, and the nanovoided polymer layer has a second nanovoid topology different from the first nanovoid topology when a second voltage different from the first voltage is applied between the primary electrode and the secondary electrode.

In certain embodiments, the nanovoided polymer layer may have a first sound attenuation coefficient when a first voltage is applied between the primary and secondary electrodes and a second sound attenuation coefficient different than the first sound attenuation coefficient when a second voltage is applied between the primary and secondary electrodes.

As will be appreciated, in an actuated or an unactuated state, the nanovoided polymer layer may have a uniform or a non-uniform void topology. For instance, the nanovoids may be open-celled and/or closed-celled and may be periodically or randomly distributed throughout a polymer matrix. In some embodiments, the nanovoids may be at least partially filled with a gas, such as air, nitrogen, oxygen, argon, sulfur hexafluoride, or an organofluoride.

According to various embodiments, an acoustic element may be configured as an acoustic insulator or as an acoustic transducer. For instance, as an acoustic insulator, an acoustic element may be configured to emit sound waves in response to sounds waves incident on the acoustic element. The emitted sound waves may have amplitudes between approximately 1% to greater than 100% of the incident sound waves, e.g., approximately 1, 2, 5, 10, 20, 50, 100, 150 or 200%, including ranges between any of the foregoing values. For resonant and non-resonant systems, for example, the emitted sound waves may have amplitudes between approximately 50% and approximately 150% of the incident sound waves. In certain embodiments, the emitted sound waves and the incident sound waves may have an out-of-phase relationship, such that the emitted sound waves may attenuate (e.g., cancel) the incident sound waves. As an acoustic transducer, the application of an AC voltage across the nanovoided polymer, for example, may be used to produce sound waves. An acoustic element may also have a sensing functionality, where sound waves incident on a layer of the nanovoided polymer may induce a measurable change in a physical parameter (e.g., resistance, capacitance and/or inductance, and the like) in the nanovoided polymer. By monitoring the capacitance of the nanovoided polymer, for instance, the extent and nature of sound waves incident on an acoustic element may be evaluated.

According to certain embodiments, a device may include an array of acoustic elements, where the acoustic elements may include a plurality of nanovoided polymer-containing acoustic insulators and/or a plurality of nanovoided polymer-containing acoustic transducers. Acoustic elements disposed within the array may be arranged on a substrate, which may be planar or non-planar, for example, and may be flexible or rigid. In some embodiments, an inter-acoustic element spacing within the array may vary from approximately 0.5 µm to approximately 15 cm.

Features from any of these or other embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
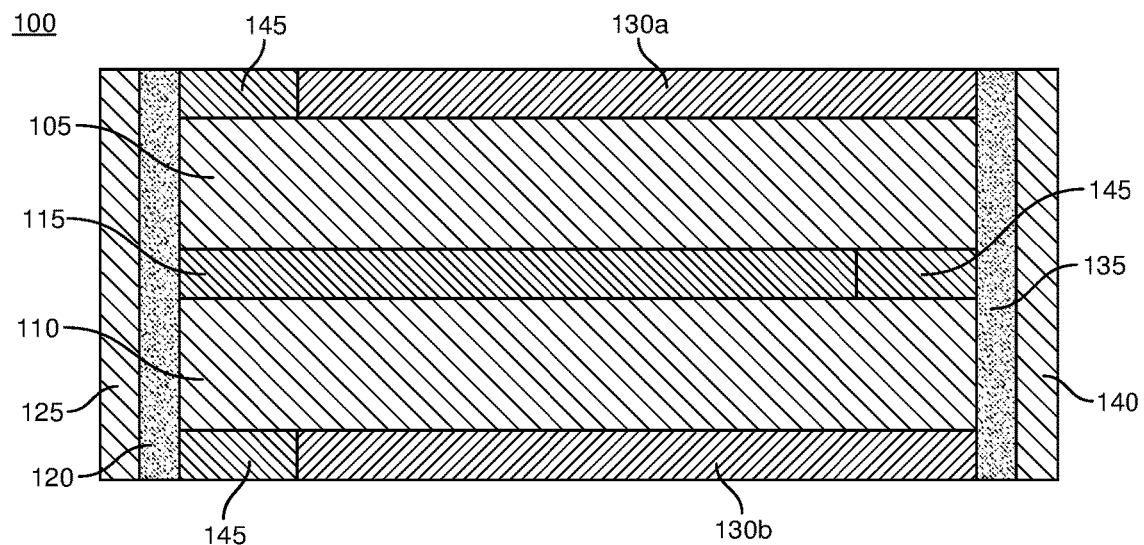
FIG. 1A is a schematic diagram of a nanovoided polymer acoustic insulator according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to acoustic devices, and more particularly to acoustic elements that include a nanovoided polymer layer. As used herein, an "acoustic device" or an "acoustic element" may, in some examples, include an article configured to interact with sound, and may include, without limitation, insulators, transducers, or sensors having passive or active functionality. In this regard, "sound" or "sound waves" may be characterized as radiant energy that typically propagates as an audible wave of pressure at a frequency of approximately 20 Hz to approximately 20,000 Hz, although greater frequencies are contemplated.

According to some embodiments, the nanovoided polymer may be actuated to control the size and shape of the voids within the polymer matrix. Control of the void geometry can be used to control the mechanical, e.g., insulating and/or transduction, properties of the acoustic element or device. For instance, a nanovoided polymer layer may have a first sound attenuation coefficient in an unactuated state and a second sound attenuation coefficient different than the first sound attenuation coefficient in an actuated state. The "attenuation" of sound waves may, in various embodiments, refer to the combined effect of scattering (e.g., via reflection) and absorption.

In some embodiments, as disclosed in further detail herein, an acoustic element may be configured to function as an acoustic insulator, an acoustic transducer, or an acoustic sensor. By way of example, the acoustic elements disclosed here may provide sound damping of at least approximately 5%, e.g., approximately 5%, approximately 10%, approximately 15%, approximately 20%, approximately 30%, or approximately 40%, including ranges between any of the foregoing values.

In accordance with various embodiments, a nanovoided polymer material, i.e., a nanovoided polymer layer, may include a polymer matrix and a plurality of nanoscale voids dispersed throughout the matrix. The polymer matrix material may include a deformable, electroactive polymer.

Electroactive Polymers

An acoustic element may include one or more electroactive polymers and may also include additional components. As used herein, "electroactive polymers" may, in some examples, refer to polymers that exhibit a change in size or shape when stimulated by an electric field. In some embodiments, an electroactive polymer may include a deformable polymer that may be symmetric with regard to electrical charge (e.g., polydimethylsiloxane (PDMS), acrylates, etc.)

or asymmetric (e.g., polyvinylidene fluoride (PVDF) or its copolymers such as poly(vinylidenefluoride-co-trifluoroethylene) (PVDF-TrFE)).

Additional examples of polymer materials forming electroactive polymers may include, without limitation, styrenes, polyesters, polycarbonates, epoxies, silicone polymers, and/or any other suitable polymer or polymer precursor materials including ethyl acetate, butyl acrylate, octyl acrylate, ethylethoxy ethyl acrylate, 2-chloroethyl vinyl ether, chloromethyl acrylate, methacrylic acid, dimethacrylate oligomers, isocyanates, allyl glycidyl ether, N-methylol acrylamide, or mixtures thereof. Example acrylates may be free-radical initiated. Such materials may have any suitable dielectric constant or relative permittivity, such as, for example, a dielectric constant ranging from approximately 2 to approximately 30.

In the presence of an electrostatic field, an electroactive polymer may deform (e.g., compress, elongate, bend, etc.) according to the strength of that field. Generation of such a field may be accomplished, for example, by placing the electroactive polymer between two electrodes, each of which is at a different potential. As the potential difference (i.e., voltage difference) between the electrodes is increased (e.g., from zero potential) the amount of deformation may also increase, principally along electric field lines. This deformation may achieve saturation when a certain electrostatic field strength has been reached. With no electrostatic field, the electroactive polymer may be in its relaxed state undergoing no induced deformation, or stated equivalently, no induced strain, either internal or external.

The physical origin of the compressive nature of electroactive polymers in the presence of an electrostatic field (E-field), being the force created between opposite electric charges, is that of the Maxwell stress, which is expressed mathematically with the Maxwell stress tensor. The level of strain or deformation induced by a given E-field is dependent on the square of the E-field strength, the dielectric constant of the electroactive polymer, and on the elastic compliance of the material in question. Compliance in this case is the change of strain with respect to stress or, equivalently, in more practical terms, the change in displacement with respect to force. In some embodiments, nanovoided polymer layers may be pre-strained (or pre-stressed) to modify the stiffness of the acoustic element.

In some embodiments, an electroactive polymer may include an elastomer. As used herein, an "elastomer" may, in some examples, refer to a material having viscoelasticity (i.e., both viscosity and elasticity), relatively weak intermolecular forces, and generally low elastic modulus (a measure of the stiffness of a solid material) and a high strain-to-failure compared with other materials. In some embodiments, an electroactive polymer may include an elastomer material that has an effective Poisson's ratio of less than approximately 0.35 (e.g., less than approximately 0.3, less than approximately 0.25, less than approximately 0.2, less than approximately 0.15, less than approximately 0.1, or less than approximately 0.05). In at least one example, the elastomer material may have an effective density that is less than approximately 90% (e.g., less than approximately 80%, less than approximately 70%, less than approximately 60%, less than approximately 50%, less than approximately 40%) of the elastomer when densified (e.g., when the elastomer is compressed, for example, by electrodes to make the elastomer more dense).

In some embodiments, the term "effective density," as used herein, may refer to a parameter that may be obtained using a test method where a uniformly thick layer of a nanovoided polymer, e.g., elastomer, may be placed between two flat and rigid circular plates. The diameter of the polymer layer may be measured, then the plates may be pressed together to exert a pressure of at least approximately $1 \times 10^6$ Pa on the polymer layer, and the diameter of the layer is remeasured. The effective density may be determined from an expression ($DR = D_{uncompressed}/D_{compressed}$), where DR may represent the effective density ratio, $D_{uncompressed}$ may represent the density of the uncompressed polymer, and $D_{compressed}$ may represent the density of the compressed polymer.

In some embodiments, the acoustic elements described herein may include an elastomeric electroactive polymer having an effective Poisson's ratio of less than approximately 0.35 and an effective uncompressed density that is less than approximately 90% of the elastomer when densified. In some embodiments, the term "effective Poisson's ratio" may refer to the negative of the ratio of transverse strain (e.g., strain in a first direction) to axial strain (e.g., strain in a second direction) in a material. In various embodiments, the electroactive polymers may include a nanovoided polymer material.

Voids

In some embodiments, an electroactive polymer layer may include a polymer matrix and voids, such as nanovoids, distributed throughout the polymer matrix. A portion of an acoustic element may have a volume fraction of voids, which may be determined as the void volume within a portion of the acoustic element divided by the total volume of the portion of the acoustic element.

In some embodiments, the nanovoids may occupy at least approximately 10% of the volume of the electroactive polymer matrix (e.g., approximately 10% by volume, approximately 20% by volume, approximately 30% by volume, approximately 40% by volume, approximately 50% by volume, approximately 60% by volume, approximately 70% by volume, approximately 80% by volume, or approximately 90% by volume, including ranges between any of the foregoing values). The voids and/or nanovoids may be either closed- or open-celled, or a mixture thereof. In the case of open-celled voids, the void size may be the minimum average diameter of the cell.

In some embodiments, nanovoids may be homogeneously or non-homogeneously distributed throughout the electroactive polymer. For instance, the void volume fraction may be a function of a distance parameter such that, in some embodiments, the void volume fraction may be a linear function of a distance from one edge of an acoustic element, for example, increasing in a generally linear fashion from one side to another. In some examples, the volume void fraction may be a non-linear function of a distance parameter, such as a polynomial function (such as a quadratic function), a step function, a parabolic function, an undulating function, a sine function, or the like. A distance parameter may be a distance from an edge of an acoustic element.

In some embodiments, a composite electroactive polymer (i.e., an electroactive polymer including a polymer matrix with nanovoids dispersed throughout the matrix) may include a thermoset polymer or an elastomeric polymer matrix having an elastic modulus of less than approximately 10 GPa (e.g., approximately 10 GPa, approximately 5 GPa, approximately 2 GPa, approximately 1 GPa, approximately 0.5 GPa, approximately 0.2 GPa, approximately 0.1 GPa, or approximately 0.05 GPa, including ranges between any of the foregoing values). Without wishing to be bound by theory, the incorporation of nanovoids into an electroactive polymer matrix may decrease the Young's modulus of the polymer material, which may increase its sound attenuation coefficient.

The voids and/or nanovoids may be any suitable size and, in some embodiments, the voids may approach the scale of the thickness of the polymer layer in the undeformed state. For example, the voids may be between approximately 10 nm to about equal to the gap between paired electrodes.

As used herein, the terminology "nanovoids," "nanoscale voids," "nanovoided," and the like may, in some examples, refer to voids having at least one sub-micron dimension, i.e., a length and/or width and/or depth, of less than 1000 nm. In some embodiments, the void size may be between approximately 10 nm and approximately 1000 nm, such as between approximately 10 and approximately 200 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, or approximately 1000 nm, including ranges between any of the foregoing values).

In example nanovoided polymers, the nanovoids may be randomly distributed throughout the polymer matrix, without exhibiting any long-range order, or the nanovoids may exhibit a regular, periodic structure having a repeat distance of approximately 20 nm to approximately 1000 nm. For instance, the voids may exhibit a lattice structure. In both disordered and ordered structures, the nanovoids may be discrete, closed-celled voids, open-celled voids that may be at least partially interconnected, or combinations thereof.

According to some embodiments, the nanovoids may be substantially spherical, although the void shape is not particularly limited. For instance, in addition to, or in lieu of spherical voids, the nanovoided polymer material may include voids that are oblate, prolate, lenticular, ovoid, etc., and may be characterized by a convex and/or a concave cross-sectional shape. The void shape may be isotropic or anisotropic. Moreover, the topology of the voids throughout the polymer matrix may be uniform or non-uniform. As used herein, the term "topology" may, with reference to the nanovoids, refer to their overall arrangement within the nanovoided polymer and may include their size and shape as well as their respective distribution (density, periodicity, etc.) throughout the polymer matrix. By way of example, the size of the voids and/or the void size distribution may vary spatially within the nanovoided polymer material, i.e., laterally and/or with respect to the thickness of the nanovoided polymer material.

Voids distributed throughout the electroactive polymer may be generally isolated from each other, or, at least in part, may be interconnected through an open-cell structure. The plurality of voids may have a uniform or a non-uniform distribution within the electroactive polymer, and an acoustic element containing the nanovoided electroactive polymer may have a uniform or a non-uniform electroactive response when an electrical signal is applied between the primary electrode and the secondary electrode, based on the distribution of voids.

A non-uniform distribution of the voids may include a spatial variation in at least one of void diameter, void volume, void number density, void volume fraction, or void orientation (e.g., in the case of anisotropic voids). A non-uniform electroactive response may include a first deformation of a first portion of the acoustic element that differs from a second deformation of a second portion of the acoustic element. A deformation may include a compression (for example, parallel to an applied electric field), change in curvature, or other change in a dimensional parameter, such as length, width, height, and the like, in one or more directions and, as discussed further herein, an accompanying change in the void topology.

A non-uniform distribution of voids within the nanovoided polymer layer of an acoustic element may include a functional dependence on a distance parameter, such as distance from an edge and/or center of the element. For example, an acoustic element may have a generally rectangular shape with a generally uniform thickness. In some embodiments, the volume fraction of voids may increase monotonically along a direction parallel to a longer side and/or a shorter side of the rectangular shape. In some examples, the void volume fraction may have a highest value in some portion of the acoustic element and decrease from the highest portion to portions with lower void volume fractions elsewhere, for example proximate an edge. In some examples, the void volume fraction may have a lowest value in some portion of the acoustic element and increase from the lowest portion to portions with higher void volume fractions elsewhere, for example proximate an edge of the acoustic element.

In some examples, an acoustic element may have a generally disk shape. The volume fraction of voids may vary as a function of a radial distance from the disk center. In some embodiments, the volume fraction may be highest in a central portion of a disk-shaped acoustic element and decrease along a radial direction to an edge. In some embodiments, the volume fraction may be lowest in a central portion and increase along a radial direction to an edge. The variation in void volume fraction may have a functional relationship with a distance parameter, for example including one or more of a linear, quadratic, sinusoidal, undulating, parabolic, or other functional relationship with a distance parameter along one or more of the relevant distance parameters. For example, a distance parameter may be determined as the distance along an edge, obliquely across, from a center, or other distance measurement for a given acoustic element.

Additives

The nanovoids may be interconnected (open cell) or fully enclosed by a suitable electroactive polymer material matrix (closed cell). In some embodiments, nanovoids may include a non-polymeric material. For instance, voids may include at least one of a gas, a liquid, a gel, a foam, or a non-polymeric solid. In some embodiments, an acoustic element may include particles of a material to assist the formation of voids, support voided regions, and/or impact the interaction of the acoustic element with sound waves.

In some embodiments, the nanovoided polymer may include particles of a material having a high dielectric constant (i.e., high-k). Such particles may have an average diameter between approximately 10 nm and approximately 1000 nm. In some embodiments, the high dielectric constant particles may include a titanate such as barium titanate.

By way of example, barium titanate ($BaTiO_3$) is a ferroelectric material with a relatively high dielectric constant (e.g., a value of between approximately 500 and approximately 7000) and polarization and may be used in various electroactive devices (e.g., acoustic devices) described herein. Besides large permittivity and polarizability, large strains may also be achievable with $BaTiO_3$. Pure $BaTiO_3$ is an insulator whereas upon doping it may transform into a semiconductor in conjunction with the polymer material.

Further example high-k materials suitable for incorporation into a nanovoided electroactive polymer as particles include $TiO_2$, $CeO_2$, $BaSrTiO_3$, $PbLaZrTiO_3$, $PbMgNbO_3$+ $PbTiO_3$, $Ta_2O_3$, and $Al_2O_3$, as well as additional metal oxides including transition metal oxides, and combinations thereof. In some embodiments, the material having the high dielectric constant may be incorporated into the nanovoids themselves and/or into the adjacent polymer matrix material.

In some embodiments, the high-k particles may be incorporated into the electroactive polymer to modify a mechanical property (e.g., a Poisson's ratio or a sound attenuation coefficient) or electrical property (e.g., resistance, capacitance, etc.).

In some embodiments, the nanovoids may be at least partially filled with a dielectric liquid or gas adapted to suppress electrical breakdown of the electroactive polymer (for example, during capacitive actuation). The gas may include air, nitrogen, oxygen, argon, sulfur hexafluoride, an organofluoride and/or any other suitable gas. In some embodiments, such a gas may have a high dielectric strength.

The application of a voltage to a nanovoided polymer layer may change the internal pressure of gases within the nanovoided regions thereof. For example, gases may diffuse either into or out of the nanovoided polymer during dimensional changes associated with its actuation and deformation. Such changes in the electroactive polymer layers can affect, for example, the hysteresis of an acoustic device incorporating the electroactive polymer during dimensional changes, and also may result in drift when the nanovoided polymer layer's dimensions are rapidly changed.

In some embodiments, an inner surface of the voids may be at least partially coated with a layer of suitable material.

Electrodes

In some embodiments, acoustic elements may include paired electrodes, which allow the creation of the electrostatic field that forces constriction of the electroactive polymer. In some embodiments, an "electrode," as used herein, may refer to a conductive material, which may be in the form of a thin film or a layer. Electrodes may include relatively thin, electrically conductive metals or metal alloys and may be of a non-compliant or compliant nature.

An electrode may include one or more electrically conductive materials, such as a metal, a semiconductor (such as a doped semiconductor), carbon nanotubes, graphene, oxidized graphene, fluorinated graphene, hydrogenated graphene, other graphene derivatives, carbon black, transparent conductive oxides (TCOs, e.g., indium tin oxide (ITO), zinc oxide (ZnO), etc.), or other electrically conducting material. In some embodiments, the electrodes may include a metal such as aluminum, gold, silver, tin, copper, indium, gallium, zinc, alloys thereof, and the like. Further example transparent conductive oxides include, without limitation, aluminum-doped zinc oxide, fluorine-doped tin oxide, indium-doped cadmium oxide, indium zinc oxide, indium gallium tin oxide, indium gallium zinc oxide, indium gallium zinc tin oxide, strontium vanadate, strontium niobate, strontium molybdate, calcium molybdate, and indium zinc tin oxide.

In some embodiments, the electrode or electrode layer may be self-healing, such that damage from local shorting of a circuit can be isolated. Suitable self-healing electrodes may include thin films of metals, such as, for example, aluminum.

In some embodiments, a primary electrode may overlap (e.g., overlap in a parallel direction) at least a portion of a secondary electrode. The primary and secondary electrodes may be generally parallel and spaced apart and separated by a layer of a nanovoided electroactive polymer. A tertiary electrode may overlap at least a portion of either the primary or secondary electrode.

An acoustic element may include a first polymer (e.g., a nanovoided elastomer material) which may be disposed between a first pair of electrodes (e.g., the primary electrode and the secondary electrode). A second acoustic element, if used, may include a second nanovoided elastomer material and may be disposed between a second pair of electrodes. In some embodiments, there may be an electrode that is common to both the first pair of electrodes and the second pair of electrodes.

In some embodiments, one or more electrodes may be optionally electrically interconnected, e.g., through a contact layer, to a common electrode. In some embodiments, an acoustic device may have a first common electrode, connected to a first plurality of electrodes, and a second common electrode, connected to a second plurality of electrodes. In some embodiments, electrodes (e.g., one of a first plurality of electrodes and one of a second plurality of electrodes) may be electrically isolated from each other using an insulator, such as a dielectric layer. An insulator may include a material without appreciable electrical conductivity, and may include a dielectric material, such as, for example, an acrylate or silicone polymer.

In some embodiments, a common electrode may be electrically coupled (e.g., electrically contacted at an interface having a low contact resistance) to one or more other electrode(s), e.g., a secondary electrode and a tertiary electrode located on either side of a primary electrode.

In some embodiments, electrodes may be flexible and/or resilient and may stretch, for example elastically, when an acoustic element undergoes deformation. Electrodes may include one or more transparent conducting oxides (TCOs) such as indium oxide, tin oxide, indium tin oxide (ITO) and the like, graphene, carbon nanotubes, and the like. In other embodiments, for example, embodiments where acoustic devices have electroactive elements including nanovoided electroactive polymer materials, relatively rigid electrodes (e.g., electrodes including a metal such as aluminum) may be used.

In some embodiments, the electrodes (e.g., the primary electrode and the secondary electrode) may have a thickness of approximately 1 nm to approximately 1000 nm, with an example thickness of approximately 10 nm to approximately 50 nm. A thickness of an electrode that includes a self-healing property (e.g., an aluminum electrode) may be approximately 20 nm. In some embodiments, a common electrode may have a sloped shape, or may be a more complex shape (e.g., patterned or freeform). In some embodiments, a common electrode may be shaped to allow compression and expansion of an acoustic element or device during operation.

The electrodes in certain embodiments may have an optical transmissivity of at least approximately 50%, e.g., approximately 50%, approximately 60%, approximately 70%, approximately 80%, approximately 90%, approximately 95%, approximately 97%, approximately 98%, or approximately 99%, including ranges between any of the foregoing values.

In some embodiments, the electrodes described herein (e.g., the primary electrode, the secondary electrode, or any other electrode including any common electrode) may be fabricated using any suitable process. For example, the electrodes may be fabricated using physical vapor deposition (PVD), chemical vapor deposition (CVD), evaporation, spray-coating, spin-coating, atomic layer deposition (ALD), and the like. In further aspects, the electrodes may be manufactured using a thermal evaporator, a sputtering system, a spray coater, a spin-coater, printing, stamping, etc.

In some embodiments, a layer of nanovoided polymer may be deposited directly on to an electrode. In some embodiments, an electrode may be deposited directly on to the nanovoided polymer. In some embodiments, electrodes may be prefabricated and attached to a nanovoided polymer. In some embodiments, an electrode may be deposited on a substrate, for example a glass substrate or flexible polymer film. In some embodiments, the polymer layer may directly contact an electrode. In some embodiments, there may be a dielectric layer, such as an insulating layer, between a layer of nanovoided polymer and an electrode. Any suitable combination of processes may be used.

Acoustic Elements

In some applications, an acoustic element used in connection with the principles disclosed herein may include a primary electrode, a secondary electrode, and an electroactive (nanovoided polymer) element disposed between the primary electrode and the secondary electrode. The electroactive element may include an electroactive polymer having a plurality of voids distributed throughout the electroactive polymer matrix, for example as a porous polymer structure.

In some embodiments, there may be one or more additional electrodes, and a common electrode may be electrically coupled to one or more of the additional electrodes. For example, acoustic elements may be disposed in a stacked configuration, with a first common electrode coupled to a first plurality of electrodes, and a second common electrode electrically connected to a second plurality of electrodes. The first and second pluralities may alternate in a stacked configuration, so that each acoustic element is located between one of the first plurality of electrodes and one of the second plurality of electrodes.

In some embodiments, an acoustic element may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of approximately 200 nm to approximately 500 nm.

In some embodiments, applying a voltage to the electrodes (e.g., the primary electrode and/or the secondary electrode) may create at least approximately 0.01% strain (e.g., an amount of deformation in the direction of the applied force resulting from the applied voltage divided by the initial dimension of the material) in the nanovoided polymer material in at least one direction (e.g., an x, y, or z direction with respect to a defined coordinate system).

In some embodiments, the electroactive response may include a mechanical response to the electrical input that varies over the spatial extent of the device, with the electrical input being applied between the primary electrode and the secondary electrode. The mechanical response may be termed an actuation, and example devices may be or include actuators.

Capacitive actuation of the nanovoided polymer may decrease the layer thickness. In certain embodiments, as the thickness of the nanovoided polymer is decreased, the tortuosity and surface area of the polymer matrix may decrease, which may decrease the capability to attenuate sound waves. Additionally, for a nanovoided polymer having a low Poisson's ratio, compression may lead to a decrease in the surface area of the voids and thus a lesser interaction of the polymer layer with an acoustic wave.

The acoustic element may be deformable from an initial state to a deformed state when a first voltage is applied between the primary electrode and the secondary electrode and may further be deformable to a second deformed state when a second voltage is applied between the primary electrode and the secondary electrode.

An electrical signal may include a potential difference, which may include a direct or alternating voltage. In some embodiments, the frequency may be higher than the highest mechanical response frequency of the device, so that deformation may occur in response to the applied RMS electric field but with no appreciable oscillatory mechanical response to the applied frequency. The applied electrical signal may generate non-uniform constriction of the nanovoided polymer layer between the primary and secondary electrodes. A non-uniform electroactive response may include a curvature of a surface of the electroactive element, which may in some embodiments be a compound curvature.

In some embodiments, an acoustic element may have a maximum thickness in an undeformed state and a compressed thickness in a deformed state. In some embodiments, an acoustic element may have a density in an undeformed state that is approximately 90% or less of a density of the acoustic element in the deformed state. In some embodiments, an acoustic element may exhibit a strain of at least approximately 0.01% when a voltage is applied between the primary electrode and the secondary electrode.

In some embodiments, an acoustic device may include one or more acoustic elements, and an acoustic element may include one or more nanovoided electroactive materials. In various embodiments, an acoustic element may include a primary electrode, a secondary electrode overlapping at least a portion of the primary electrode, and a nanovoided electroactive polymer layer disposed between the primary electrode and the secondary electrode. In some embodiments, the acoustic element may include an electroactive polymer.

In some embodiments, an acoustic element may include an electroactive polymer configured with a first distribution of nanovoids within a first region such that the first region has a different transduction behavior from a second region having a second distribution of nanovoids. In some embodiments, a global electric field applied over an entirety of an electroactive element may generate differential deformation between the first and second regions.

An acoustic element may have a plurality of regions of patterned nanovoids such that when a first voltage is applied the electroactive polymer exhibits a predetermined deformation, e.g., compound curvature. The acoustic element may exhibit a second predetermined compound curvature, different from the first predetermined compound curvature, when a second voltage is applied. In some embodiments, the primary electrode and/or the secondary electrode may be patterned, allowing a localized electric field to be applied to a portion of the acoustic element, for example, to provide a localized deformation and a corresponding localized interaction with sound.

An acoustic device may include a plurality of stacked layers; for example, each layer may include an electroactive element disposed between a pair of electrodes. In some embodiments, an electrode may be shared between layers; for example, a device may have alternating electrodes and electroactive elements located between neighboring pairs of electrodes. Various stacked configurations can be constructed in different geometries that alter the shape, alignment, and spacing between layers. Such complex arrangements can enable compression, extension, twisting, and/or bending when operating the acoustic device.

In some embodiments, an acoustic device may include additional electroactive elements interleaved between electrodes, such as in a stacked configuration. For example, electrodes may form an interdigitated stack of electrodes, with alternate electrodes connected to a first common electrode and the remaining alternate electrodes connected to a second common electrode. For example, an additional acoustic element may be disposed on the other side of a primary electrode. The additional acoustic element may overlap a first acoustic element. An additional electrode may be disposed abutting a surface of any additional acoustic element.

In some embodiments, an acoustic device may include more (e.g., two, three, or more) such additional acoustic elements and corresponding electrodes. For example, an acoustic device may include a stack of two or more acoustic elements and corresponding electrodes. For example, an acoustic device may include between 2 electroactive elements to approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, or greater than approximately 2000 acoustic elements.

In certain embodiments, an acoustic element may be configured as a sound insulator to block (i.e., absorb or reflect) sound waves. The tortuosity and high surface area of the nanovoided polymer layer may dissipate sound wave energy at multiple boundaries between the polymer matrix and the nanovoids. Furthermore, the incorporation of nanovoids into the electroactive polymer may decrease the Young's modulus of the polymer, which may increase the sound attenuation coefficient and sound absorption of the acoustic element.

According to some embodiments, an acoustic element can convert interactions with sound into electrical signals, such as proportional electrical signals that scale with a deformation parameter (such as an applied acoustic pressure). An acoustic element may also receive an electrical signal that induces a sound based on the electrical signal (for example, based on the voltage squared or mean square voltage). The process by which variations in an acoustic quantity transforms into an electrical signal, and/or vice versa, may be referred to as transduction. Thus, an acoustic device may be a transducer, with a degree of sound output based on the electrical signal, and/or a sensor providing an electrical signal based on a degree of sound input. A transducer may include an electroactive element, such as a nanovoided electroactive polymer element. In some examples, an electroactive element may include an electroactive polymer with a distribution of voids formed therein. The electroactive response may be mediated by the dielectric constant and elastic modulus of the acoustic element. In some embodiments, the electrical response of a transducer may be correlated with a degree and/or location of an acoustic input.

In certain embodiments, using a single nanovoided polymer layer may constrain the transducer response to a particular input electrical signal/output acoustic response across the device. In some embodiments, an acoustic device produces and/or senses sound waves as a function of position within a single device, without the need for complex electrode structures, facilitating electroactive devices (such as transducers and/or sensors) capable of spatially variable actuation and sensing responses, using a simple electrical architecture such as a pair of electrodes.

In some embodiments, an acoustic sensor may include an electroactive device, where the electroactive device includes a first and a second portion, where the first portion has a different sensory response than the second portion due to a particular distribution of nanovoids.

In some embodiments, an acoustic element may have a generally cuboid shape, for example having a length, width, and thickness, for example as determined along generally mutually orthogonal directions. The thickness of the acoustic element may be approximately equal to the electrode separation. In some embodiments, an acoustic element may have a disk shape, a wedge shape, a sheet shape, an elongated form such as a rod, or other shape. A distance parameter may be (as appropriate) a distance along an edge (e.g. a distance from one side towards another side), a radial distance (e.g. a distance from a center or an edge of a disk-shaped form in a generally radial direction), or other distance measurement.

In some embodiments, a volume void fraction may be a function of a distance parameter over a plurality of acoustic elements, for example, including a plurality of acoustic elements having different mean void volume fractions (optionally having an appreciable internal variation of void volume fraction, or in some embodiments no appreciable internal variation of void volume fraction) arranged to obtain a desired variation of void volume fraction with distance across a plurality of acoustic elements.

Acoustic Element and Device Fabrication

Various fabrication methods are discussed herein. As will be appreciated, properties of an acoustic element or an acoustic device may be varied across a spatial extent by varying one or more process parameters, such as wavelength, intensity, substrate temperature, other process temperature, gas pressure, radiation dosage, chemical concentration gradients, chemical composition variations (e.g., to control micelle size), or other process parameter. Non-uniform void size distributions, for example, may be obtained by varying the size of sacrificial regions within an electroactive polymer.

Example methods of forming nanovoided polymer thin films having randomly-distributed (i.e., disordered) voids include selectively depositing a polymer composition or a polymeric precursor composition to form voids in situ, or depositing a polymer or polymeric precursor composition containing a templating agent that directs the structural formation of voids and then selectively removing the templating agent. A templating agent may be any phase of matter (solid, liquid, gas). Example methods of forming nanovoided polymer thin films having a regular (i.e., ordered) arrangement of voids may include self-assembly or various lithography techniques.

According to some embodiments, deposition methods, including spin-coating, inkjet printing, chemical vapor deposition, vapor coating, thermal spraying, extrusion, or lamination may be used to form a nanovoided polymer layer. In certain embodiments, a nanovoided polymer layer may be deposited directly onto an electrode. In alternate embodiments, a nanovoided polymer layer may be deposited onto a provisional substrate and transferred to an electrode or an electroded substrate.

Methods of forming an acoustic element include forming electrodes and electroactive elements sequentially (e.g., via vapor deposition, coating, printing, etc.) or simultaneously (e.g., via co-flowing, coextrusion, slot die coating, etc.). Alternatively, nanovoided polymer layers may be deposited using initiated chemical vapor deposition (iCVD), where, for example, suitable monomers of the desired polymers may be used to form the desired coating. In some embodiments, monomers, oligomers, and/or prepolymers may optionally be mixed with a solvent and the solvent may be removed from the polymeric matrix during and/or following curing to form nanovoids. Example solvents include alcohols, aliphatic, aromatic, or halogenated hydrocarbons, as well as combinations thereof.

A method of fabricating an acoustic element may include depositing a curable material onto a primary electrode, curing the deposited curable material to form an electroactive layer (e.g., including a cured elastomer material) and depositing an electrically conductive material onto a surface of the electroactive layer opposite the primary electrode to form a secondary electrode. In some embodiments, a method may further include depositing an additional curable material onto a surface of the secondary electrode opposite the electroactive layer, curing the deposited additional curable material to form a second electroactive layer including a second cured elastomer material, and depositing an additional electrically conductive material onto a surface of the second electroactive layer opposite the secondary electrode to form a tertiary electrode.

In some embodiments, a method of fabricating an acoustic element may include vaporizing a curable material, or a precursor thereof, where depositing the curable material may include depositing the vaporized curable material onto the primary electrode. In some embodiments, a method of fabricating an acoustic element may include printing the polymer or precursor thereof (such as a curable material) onto an electrode. In some embodiments, a method may also include combining a polymer precursor material with at least one other component to form a deposition mixture. In some embodiments, a method may include combining a curable material with particles of a material having a high dielectric constant to form a deposition mixture.

According to some embodiments, a method may include positioning a curable material between a first electrically conductive material and a second electrically conductive material. The positioned curable material may be cured to form a cured elastomer material. In some embodiments, the cured elastomer material may have a Poisson's ratio of approximately 0.35 or less. In some embodiments, at least one of the first electrically conductive material or the second electrically conductive material may include a curable electrically conductive material, and the method may further include curing the at least one of the first electrically conductive material or the second electrically conductive material to form an electrode. In this example, curing the at least one of the first electrically conductive material or the second electrically conductive material may include curing the at least one of the first electrically conductive material or the second electrically conductive material during curing of the positioned curable material.

In some embodiments, a curable material and at least one of a first electrically conductive material or a second electrically conductive material may be flowable during positioning of the curable material between the primary and secondary electrodes. A method of fabricating an acoustic element may further include flowing a curable material and at least one of the first electrically conductive material or the second electrically conductive material simultaneously onto a substrate.

In some embodiments, methods for fabricating an acoustic element (e.g., an actuator) may include masks (e.g., shadow masks) to control the patterns of one or more deposited materials.

In some embodiments, a nanovoided polymer layer may be fabricated on a surface enclosed by a deposition chamber, which may be evacuated (e.g., using one or more mechanical vacuum pumps to a predetermined level such as $10^{-6}$ Torr or below). A deposition chamber may include a rigid material (e.g., steel, aluminum, brass, glass, acrylic, and the like). A surface used for deposition may include a rotating drum. In some embodiments, the rotation may generate centrifugal energy and cause the deposited material to spread more uniformly over any underlying sequentially deposited materials (e.g., electrodes, polymer elements, and the like) that are mechanically coupled to the surface. In some embodiments, the surface may be fixed and the deposition and curing systems may move relative to the surface, or both the surface, the deposition, and/or curing systems may be moving simultaneously.

In some embodiments, an acoustic device (e.g., an actuator, sensor, or the like) may be fabricated by: providing an electrically conductive layer (e.g., a primary electrode) having a first surface; depositing (e.g., vapor depositing) a nanovoided polymer (e.g., an electroactive polymer) or polymer precursor (such as a monomer) onto the electrode; as needed, forming a nanovoided polymer such as an electroactive polymer from the polymer precursor (e.g., by curing or a similar process); and depositing another electrically conductive layer (e.g., a secondary electrode) onto the electroactive polymer. In some embodiments, the method may further include repeating one or more of the above to fabricate additional layers (e.g., a second electroactive element, other electrodes, alternating stack of polymer layers and electrodes, and the like. An electroactive (e.g., acoustic) device may have a stacked configuration.

In some embodiments, an acoustic element may be fabricated by first depositing a primary electrode, and then depositing a curable material (e.g., a monomer) on the primary electrode (e.g., deposited using a vapor deposition process). In some embodiments, an inlet to a deposition chamber may open and may input an appropriate monomer initiator for starting a chemical reaction. In some embodiments, "monomer," as used herein, may refer to a monomer that forms a given polymer (i.e., as part of an electroactive element). In other examples, polymerization of a polymer precursor (such as a monomer) may include exposure to electromagnetic radiation (e.g., visible, UV, x-ray or gamma radiation), exposure to other radiation (e.g., electron beams, ultrasound), heat, exposure to a chemical species (such as a catalyst, initiator, and the like), or some combination thereof.

Deposited curable material may be cured with a source of radiation (e.g., electromagnetic radiation, such as UV and/or visible light) to form a nanovoided polymer layer that includes a cured elastomer material, for example by photopolymerization. In some embodiments, a radiation source may include an energized array of filaments that may generate electromagnetic radiation, a semiconductor device such as a light-emitting diode (LED) or semiconductor laser, other laser, fluorescence or an optical harmonic generation source, and the like. A monomer and an initiator (if used) may react upon exposure to radiation to form an electroactive element.

In some embodiments, radiation may include radiation having an energy (e.g., intensity and/or photon energy) capable of breaking covalent bonds in a material. Radiation examples may include electrons, electron beams, ions (such as protons, nuclei, and ionized atoms), x-rays, gamma rays, ultraviolet light, visible light, or other radiation, e.g., having appropriately high energy levels. In some embodiments, the cured elastomer material may include at least one non-polymeric component in a plurality of defined regions and the method may further include removing at least a portion of the at least one non-polymeric component from the cured elastomer material to form a voided (e.g., nanovoided) polymer element.

An electrically conductive material may then be deposited onto a surface of the first electroactive element opposite a primary electrode to form a secondary electrode. An additional curable material may be deposited onto a surface of the secondary electrode opposite the electroactive element. For example, the deposited additional curable material may be cured to form a second electroactive element, for example including a second cured elastomer material. In some embodiments, an additional electrically conductive material may be deposited onto a surface of the second electroactive element opposite the secondary electrode to form a tertiary electrode.

In some embodiments, a deposition chamber may have an exhaust port configured to open to release at least a portion of the vapor in the chamber during and/or between one or more depositions of the materials (e.g., monomers, oligomers, monomer initiators, conductive materials, etc.). In some embodiments, a deposition chamber may be purged (e.g., with a gas or the application of a vacuum, or both) to remove a portion of the vapor (e.g., monomers, oligomers, monomer initiators, metal particles, and any resultant by-products). Thereafter, one or more of the previous steps may be repeated (e.g., for a second electroactive element, and the like). In this way, individual layers of an acoustic device may be maintained at high purity levels.

In some embodiments, the deposition of the materials (e.g., monomers, oligomers, monomer initiators, conductive materials, etc.) of the acoustic device may be performed using a deposition process, such as chemical vapor deposition (CVD). CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more electrodes, electroactive polymers, etc.). Frequently, volatile by-products are also produced, which may be removed by gas flow through the chamber.

In some embodiments, an acoustic device may be fabricated using an atmospheric pressure CVD (APCVD) coating formation technique (e.g., CVD at atmospheric pressure). In some embodiments, an acoustic device may be fabricated using a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one aspect, a fabrication apparatus may apply an ultrahigh vacuum CVD (UHVCVD) process (e.g., CVD at very low pressure, typically below approximately $10^{-6}$ Pa (equivalently, approximately $10^{-8}$ torr)).

In some embodiments, an acoustic device may be fabricated using an aerosol assisted CVD (AACVD) process (e.g., a CVD process in which the precursors are transported to the substrate) by means of a liquid/gas aerosol, which may be generated ultrasonically or with electrospray. In some embodiments, AACVD may be used with non-volatile precursors. In some embodiments, an acoustic device may be fabricated using a direct liquid injection CVD (DLI-CVD) process (e.g., a CVD process in which the precursors are in liquid form, for example, a liquid or solid dissolved in a solvent). Liquid solutions may be injected in a deposition chamber using one or more injectors. The precursor vapors may then be transported as in CVD. DLI-CVD may be used on liquid or solid precursors, and high growth rates for the deposited materials may be reached using this technique.

In some embodiments, an acoustic device may be fabricated using a hot wall CVD process (e.g., CVD in which the deposition chamber is heated by an external power source and the acoustic device is heated by radiation from the heated wall of the deposition chamber). In another aspect, an acoustic device may be fabricated using a cold wall CVD process (e.g., a CVD in which only the device is directly heated, for example, by induction, while the walls of the chamber are maintained at room temperature).

In some embodiments, an acoustic device may be fabricated using a microwave plasma-assisted CVD (MPCVD) process, where microwaves are used to enhance chemical reaction rates of the precursors. In another aspect, an acoustic device may be fabricated using a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the device or in depositing certain materials (e.g., organic materials and/or some polymers).

In some embodiments, an acoustic element or device may be fabricated using a remote plasma-enhanced CVD (RPECVD) process. In some embodiments, RPECVD may be similar to PECVD except that the acoustic element or device may not be directly in the plasma discharge region. In some embodiments, the removal of the electroactive device from the plasma region may allow for the reduction of processing temperatures down to room temperature (i.e., approximately 23° C.).

In some embodiments, an acoustic device may be fabricated using an atomic-layer CVD (ALCVD) process. In some embodiments, ALCVD may deposit successive layers of different substances to produce layered, crystalline film coatings on the acoustic device.

In some embodiments, an acoustic device may be fabricated using a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (monolayer) to several micrometers in thickness) and nanomaterials, which may be used in forming the acoustic device.

In some embodiments, an acoustic device may be fabricated using a hot filament CVD (HFCVD) process, which may also be referred to as catalytic CVD (cat-CVD) or initiated CVD (iCVD). In some embodiments, this process may use a hot filament to chemically decompose the source gases to form the materials of the device. Moreover, the filament temperature and temperature of portions of the acoustic device may be independently controlled, allowing colder temperatures for better adsorption rates at the acoustic device, and higher temperatures necessary for decomposition of precursors to free radicals at the filament.

In some embodiments, an acoustic device may be fabricated using a hybrid physical-chemical vapor deposition (HPCVD) process. HPCVD may involve both chemical decomposition of precursor gas and vaporization of a solid source to form the materials on the acoustic device.

In some embodiments, an acoustic device may be fabricated using metalorganic chemical vapor deposition (MOCVD) process (e.g., a CVD that uses metalorganic precursors) to form materials on the acoustic device. For example, an electrode may be formed on an electroactive polymer element using this approach.

In some embodiments, an acoustic device may be fabricated using a rapid thermal CVD (RTCVD) process. This CVD process uses heating lamps or other methods to rapidly heat the acoustic element. Heating only the acoustic element during fabrication thereof rather than the precursors or chamber walls may reduce unwanted gas-phase reactions that may lead to particle formation in the acoustic element.

In some embodiments, an acoustic element may be fabricated using a photo-initiated CVD (PICVD) process. This process may use UV light to stimulate chemical reactions in the precursor materials used to make the materials for the acoustic element. Under certain conditions, PICVD may be operated at or near atmospheric pressure.

In some embodiments, acoustic elements may be fabricated by a process including depositing a curable material (e.g., a monomer such as an acrylate or a silicone) and a solvent for the curable material onto a substrate, heating the curable material with at least a portion of the solvent remaining with the cured monomer, and removing the solvent from the cured monomer. Using this process, voids such as nanovoids may be formed in the electroactive element. In some embodiments, a flowable material (e.g., a solvent) may be combined with the curable materials (e.g., monomers and conductive materials) to create a flowable mixture that may be used for producing electroactive polymers with nanovoids. The monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene (EO) diacrylate, trifunctional materials such as trimethylolpropane triacrylate (TMPTA), and/or higher functional materials. Other types of monomers may be used, including, for example, isocyanates, and these may be mixed with monomers with different curing mechanisms.

In some embodiments, the flowable material may be combined (e.g., mixed) with a curable material (e.g., a monomer). In some embodiments, a curable material may be combined with at least one non-curable component (e.g., particles of a material having a high dielectric constant) to form a mixture including the curable material and the at least one non-curable component, for example, on an electrode (e.g., a primary electrode or a secondary electrode) of the acoustic device. Alternatively, the flowable material (e.g., solvent) may be introduced into a vaporizer to deposit (e.g., via vaporization or, in alternative embodiments, via printing) a curable material onto an electrode. In some embodiments, a flowable material (e.g., solvent) may be deposited as a separate layer either on top or below a curable material (e.g., a monomer) and the solvent and curable material may be allowed to diffuse into each other before being cured by a source of radiation to generate an electroactive polymer having nanovoids. In some embodiments, after the curable material is cured, the solvent may be allowed to evaporate before another electroactive polymer or another electrode is formed. In some embodiments, the evaporation of the solvent may be accelerated by the application of heat to the surface with a heater, which may, for example, be disposed within a drum forming surface and/or any other suitable location, or by reducing the pressure of the solvent above the substrate using a cold trap (e.g., a device that condenses vapors into a liquid or solid), or a combination thereof.

In some embodiments, the solvent may have a vapor pressure that is similar to at least one of the monomers being evaporated. The solvent may dissolve both the monomer and the generated electroactive polymer, or the solvent may dissolve only the monomer. Alternatively, the solvent may have low solubility for the monomer, or plurality of monomers if there is a mixture of monomers being applied. Furthermore, the solvent may be immiscible with at least one of the monomers and may at least partially phase separate when condensed on the substrate.

In some embodiments, a method of generating a nanovoided polymer for use in connection with an acoustic device (such as acoustic devices described variously herein) may include co-depositing a monomer or mixture of monomers, a surfactant, and a non-solvent material associated with the monomer(s) that is compatible with the surfactant.

In various examples, the monomer(s) may include, but not be limited to, ethyl acrylate, butyl acrylate, octyl acrylate, ethoxy ethyl acrylate, 2-chloroethyl vinyl ether, chloromethyl acrylate, methacrylic acid, allyl glycidyl ether, and/or N-methylol acrylamide.

In some aspects, the surfactant may be ionic or non-ionic (for example SPAN 80, available from Sigma-Aldrich Company). In another aspect, the non-solvent material may include organic and/or inorganic non-solvent materials. For instance, the non-solvent material may include water or a hydrocarbon or may include a highly polar organic compound such as ethylene glycol. As noted, the monomer or monomers, non-solvent, and surfactant may be co-deposited. Alternatively, the monomer or monomers, non-solvent, and/or surfactant may be deposited sequentially. In one aspect, a substrate temperature may be controlled to generate and control one or more properties of the resulting emulsion generated by co-depositing or sequentially depositing the monomer or monomers, non-solvent, and surfactant. The substrate may be treated to prevent destabilization of the emulsion. For example, an aluminum layer may be coated with a thin polymer layer made by depositing a monomer followed by curing the monomer. In accordance with various embodiments, a substrate may include an electrode.

A curing agent, if provided, may include polyamines, higher fatty acids or their esters, sulfur, or a hydrosilylation catalyst, for example. In some embodiments, a mixture of curable monomers with cured polymers may be used. Furthermore, stabilizers may be used, for example, to inhibit environmental degradation of the nanovoided polymer. Example stabilizers include antioxidants, light stabilizers and heat stabilizers.

As discussed throughout the instant disclosure, the disclosed devices, systems, and methods may provide one or more advantages over conventional devices, systems, and methods. For example, in contrast to prior devices, the acoustic devices presented herein may include nanovoided electroactive elements that achieve substantially uniform strain in the presence of an electrostatic field produced by a potential difference between paired electrodes, permitting the acoustic devices to achieve, for example, improvements in both sound attenuation, transduction, and sensing. Such uniform strain may reduce or eliminate unwanted deformations in the acoustic elements and may result in greater overall deformation, such as compression, of the acoustic elements, providing a greater degree of sound cancellation, for example, while requiring a lower amount of energy to provide such deformation.

The acoustic elements may include polymer materials having nanovoided regions that allow for additional compression in the presence of a voltage gradient in comparison to non-voided materials. Additionally, an acoustic device may be formed in a stacked structure having a plurality of acoustic elements that are layered with multiple electrodes, enabling the plurality of acoustic elements to be actuated in conjunction with each other in a single device that may undergo a more substantial degree of deformation (e.g., compression and/or expansion) in comparison to a device having a single electroactive element or layer, which may provide for improved control and performance in sound absorption, sound transduction, and/or sound sensing applications.

Polymer materials including voids having nanoscale dimensions may possess a number of advantageous attributes. For example, the incorporation of nanovoids into a polymer matrix may increase the permittivity and sound damping characteristics of the resulting composite without increasing its density. Furthermore, the high surface area-to-volume ratio associated with nanovoided polymers will provide a greater interfacial area between the nanovoids and the surrounding polymer matrix, which may contribute to more effective sound absorption. For instance, the amount of sound attenuation may be proportional to the tortuosity of the nanovoided polymer, as well as to the surface area of the porous matrix.

In some embodiments, the application of a voltage to a nanovoided polymer layer may change the topology of the voids within the polymer. In accordance with various embodiments, the manipulation of the nanovoid topology can be used to actively control the sound attenuation coefficient of the nanovoided polymer layer and an associated acoustic element.

As will be explained in greater detail below, some embodiments of the instant disclosure relate to switchable acoustic elements that include a nanovoided polymer layer. For instance, the nanovoided polymer layer may exhibit a first sound attenuation coefficient in an unactuated state and a second sound attenuation coefficient different than the first sound attenuation coefficient in an actuated state. Capacitive actuation, mechanical actuation, or actuation of the nanovoided polymer layer by other methods may be used to reversibly manipulate the void topology and hence the mechanical (e.g., insulation, transduction, and/or sensing) properties of the polymer layer.

The following will provide, with reference to FIGS. 1-13, a detailed description of methods and systems related to the manufacture and implementation of nanovoided polymers for tunable acoustic damping or transduction. The discussion associated with FIG. 1A and FIG. 1B includes a description of a nanovoided polymer acoustic insulator. The discussion associated with FIG. 2A and FIG. 2B relates to the distribution of voids within example nanovoided polymer layers. The discussion associated with FIG. 3A and FIG. 3B includes a description of a nanovoided polymer transducer. FIG. 4A and FIG. 4B depict an acoustic sensor having a nanovoided polymer layer. The discussion associated with FIG. 5 includes a description of a laminated glass product, such as an automotive or architectural glazing, having a nanovoided polymer acoustic insulator/nanovoided polymer transducer array. The discussion associated with FIG. 6A and FIG. 6B relates to a nanovoided polymer multilayer structure. The discussion associated with FIG. 7 includes a description of a device having an array of nanovoided polymer insulator and nanovoided polymer transducer elements disposed over a substrate. The discussion associated with FIGS. 8-13 relates to exemplary virtual reality and augmented reality device architectures that may include a nanovoided polymer layer, a nanovoided polymer acoustic insulator or a nanovoided polymer transducer as disclosed herein.

A "nanovoided polymer acoustic insulator" (NVPI) may, in some examples, include a multilayer stack of a nanovoided polymer. Optionally, one or more layers of the nanovoided polymer may include a thermoset material and may be disposed between conductive electrodes. The nanovoided polymer acoustic insulator may be used for active or passive noise reduction. In example embodiments, a nanovoided polymer acoustic insulator may have a total thickness ranging from approximately 1 mm to approximately 10 mm. In certain embodiments, a nanovoided polymer acoustic insulator may also operate as a thermal insulator. In certain embodiments, a nanovoided polymer acoustic insulator may be configured to function as an actuator.

A "nanovoided polymer transducer" (NVPT) may, in some examples, include a multilayer stack of a nanovoided polymer, where the nanovoided polymer stack is disposed between at least one electrode pair. In some embodiments, the nanovoided polymer transducer may be configured to sense or measure sound waves, e.g., as a microphone, based on capacitive effects. In some embodiments, the nanovoided polymer transducer may be configured to create sound waves when an AC signal (i.e., AC voltage) is applied to the stack through the electrodes. For instance, the sound waves may be created at a surface of the transducer, e.g., as a speaker. In still further embodiments, the nanovoided polymer transducer may be configured to both sense (e.g., measure) and emit sound. In example embodiments, a nanovoided polymer transducer may have a total thickness ranging from approximately 100 microns to approximately 1 mm. In certain embodiments, a nanovoided polymer transducer may also operate as a thermal insulator.

In accordance with various embodiments, a nanovoided polymer layer may be disposed between a primary electrode and a secondary electrode. According to some embodiments, an acoustic element may include a primary electrode, a secondary electrode overlapping at least a portion of the primary electrode, and a nanovoided polymer layer disposed between and abutting the primary electrode and the secondary electrode.

The application of a voltage between the electrodes can cause compression of the nanovoided polymer layer in the direction of the applied electric field and an associated expansion or contraction of the nanovoided polymer layer in one or more transverse dimensions. Such actuation can be used to manipulate the topology of nanovoids within the polymer matrix and, in turn, the acoustic properties of the polymer layer.

As noted, acoustic elements may include actuators that include electroactive polymers. In some embodiments, the acoustic elements may include at least two layers, with each layer being driven by a pair of electrodes. FIG. 1A shows an acoustic element (e.g., an acoustic insulator) 100 with a first electroactive polymer layer (e.g., a first nanovoided elastomer material) 105 and a second electroactive polymer layer (e.g., a second nanovoided elastomer material) 110, a primary electrode 130a, a secondary electrode 115, and a tertiary electrode 130b.

In some embodiments, the primary electrode 130a and the tertiary electrode 130b are optionally connected through a first contact (e.g., schoopage) layer 135 to a primary common electrode 140. In some examples, a secondary electrode 115 may be connected to a second optional contact (e.g., schoopage) layer 120 to a secondary common electrode 125. The secondary electrode 115 may be electrically isolated from the primary electrode 130a and tertiary electrode 130b, for example, with an insulator 145. The insulator 145 may be an electroactive polymer or a different dielectric material, such as, for example, an acrylate or silicone polymer. In some embodiments, the first contact layer 135 or the second contact layer 120 may include a metal. In another aspect, the first contact layer 135 or the second contact layer 120 may include material that is similar, but not necessarily identical to, one or more of the electrodes (e.g., primary electrode 130a, secondary electrode 115, tertiary electrode 130b, primary common electrode 140, or secondary common electrode 125).

In some embodiments, the secondary electrode 115 may overlap (e.g., overlap in a horizontal direction) at least a portion of the primary electrode 130a, and the tertiary electrode 130b may overlap at least a portion of the secondary electrode 115. The first electroactive polymer layer 105 may include a first elastomer material disposed between and abutting the primary electrode 130a and the secondary electrode 115. The second electroactive polymer layer 110 may include a second elastomer material disposed between and abutting the secondary electrode 115 and the tertiary electrode 130b.

In some embodiments, the primary common electrode 140 may be electrically coupled (e.g., electrically contacted at an interface having a low contact resistance) to the primary electrode 130a and the tertiary electrode 130b. The secondary common electrode 125 may be electrically coupled to the secondary electrode 115.

In some embodiments, the acoustic element 100 may include additional layers that are not shown in FIG. 1A. For example, an additional electroactive polymer layer (not shown) may be disposed on a side of the tertiary electrode 130b opposite the second electroactive polymer layer 110. The additional electroactive polymer layer may overlap the first electroactive polymer layer 105 and the second electroactive polymer layer 110. Moreover, an additional electrode may be disposed abutting a surface of one of the additional electroactive polymer layers that faces away from the second electroactive polymer layer 110. In some embodiments, the acoustic element 100 may include more (e.g., two, three, or more) such additional electroactive polymer layers and corresponding electrodes (not shown). For example, an acoustic element may include a stack of from two electroactive polymer layers and corresponding electrodes to 10000 electroactive polymer layers (e.g., 2, 3, 4, 5, 10, 20, 50, 100, 200, 500, 1000, 2000, 5000 or 10000 electroactive polymer layers, including ranges between any of the foregoing values).

In some embodiments, the common electrodes (e.g., the primary common electrode 140 and the secondary common electrode 125) may be structured in a number of different ways than shown in FIG. 1A. For example, the common electrodes may form a sloped shape, or may be a more complex shape (e.g., patterned or freeform). In some embodiments, the common electrodes may be shaped to allow compression and expansion of the acoustic device during operation.

Figure 1B:
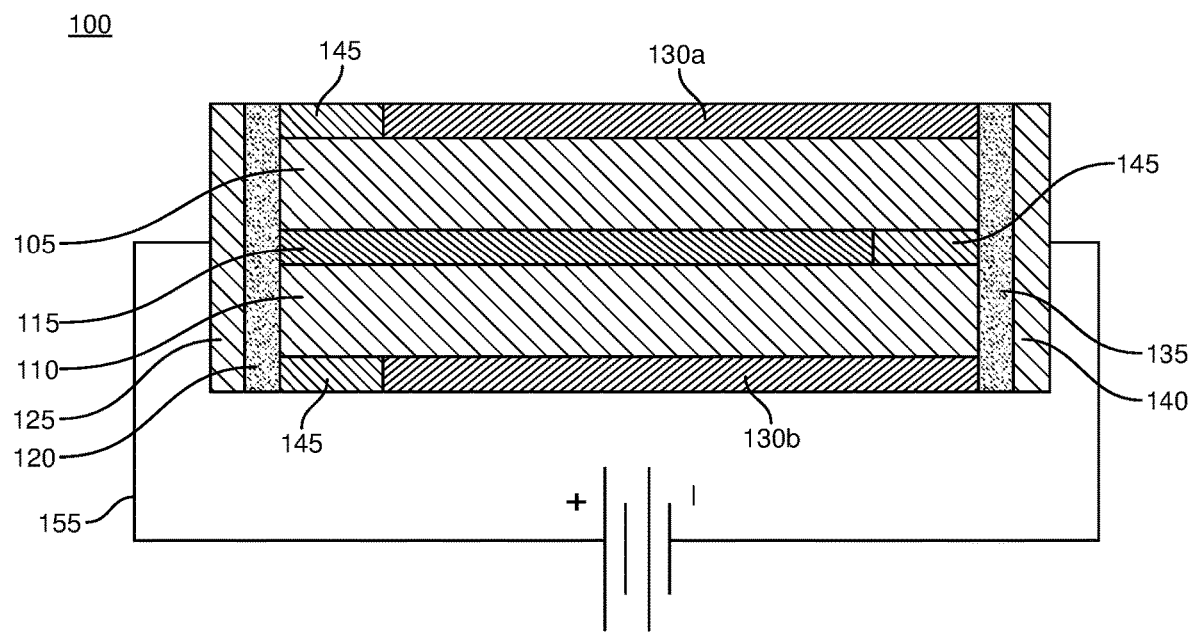
FIG. 1B is a schematic diagram depicting the capacitive actuation of the nanovoided polymer acoustic insulator of FIG. 1A according to some embodiments.

Referring to FIG. 1B, with the application of a voltage, e.g., through circuit 155, the nanovoided polymer layers 105, 110 may be compressed or expanded. Such actuation may be used to generate a change in the acoustic attenuation of an acoustic wave travelling through the acoustic element 100.

According to certain embodiments, the dynamic range of an achievable attenuation through capacitive actuation can be controlled by factors including, but not limited to, nanovoid shape, nanovoid interconnectedness, polymer permeability (i.e., diffusion through the non-nanovoided polymer matrix), material decomposition, nanovoid polydispersity, nanovoid size, nanovoid packing structure, nanovoid porosity, and the applied electric field, for example.

Figure 2A:
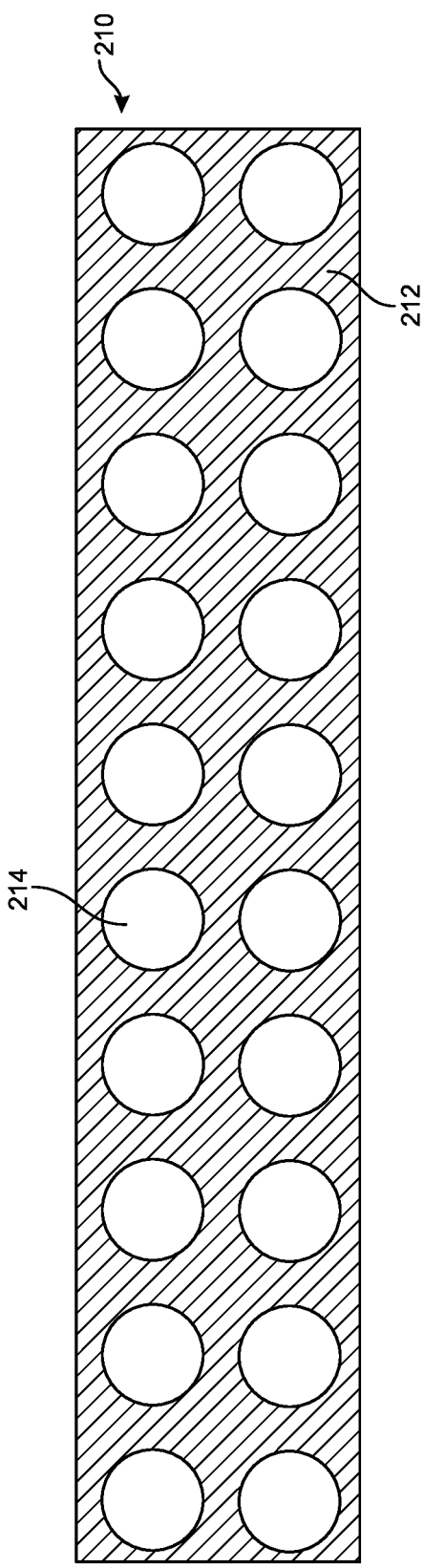
FIG. 2A is a schematic diagram of a nanovoided polymer layer having a homogeneous distribution of nanovoids according to certain embodiments.
Figure 2B:
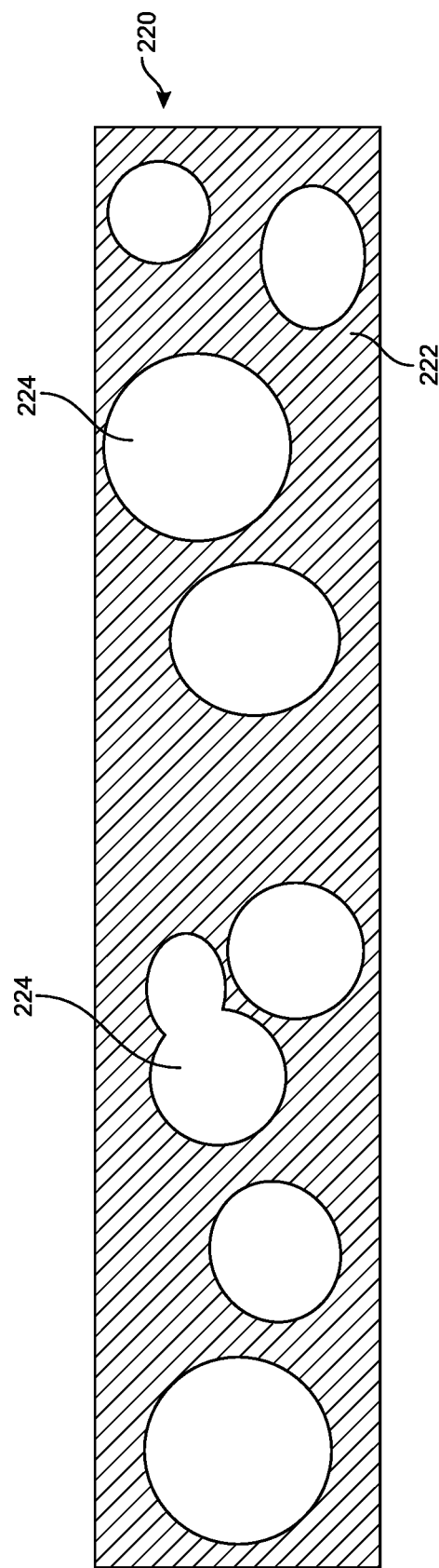
FIG. 2B is a schematic illustration of a nanovoided polymer layer having a non-homogeneous distribution of nanovoids according to certain embodiments.
Figure 3A:
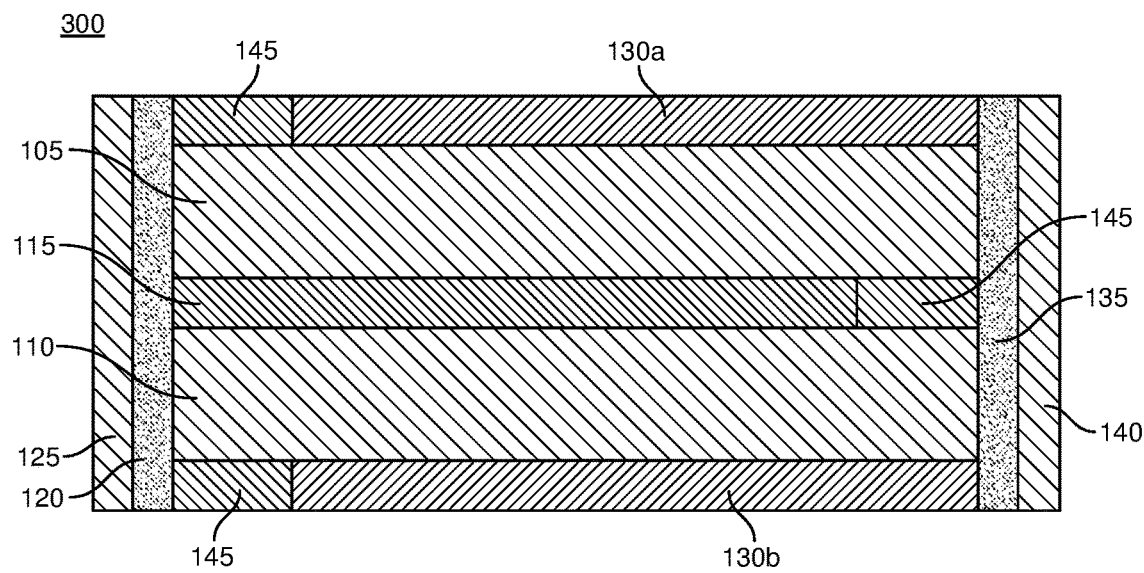
FIG. 3A is a schematic illustration of a nanovoided polymer transducer according to some embodiments.

Further to the foregoing, acoustic attenuation may be increased by introducing polydispersity in the nanovoided polymer, including variability in the nanovoid size and shape, the quasi-random distribution of the nanovoids, and by controlling the open or closed character of the nanovoids. In this regard, according to some embodiments, FIG. 2A illustrates a nanovoided polymer layer 210 having a polymer matrix 212 with a regular, homogeneous distribution of nanovoids 214 dispersed throughout the polymer matrix 212, whereas a polydisperse nanovoided polymer layer 220 having an irregular distribution of nanovoids 224 dispersed through a polymer matrix 222 is shown in FIG. 2B.

In some embodiments, the suppression of low frequency noise (<1000 Hz) may be affected by operating a nanovoided polymer-containing acoustic element as a transducer. Referring to FIG. 3A, such an acoustic element (transducer) 300, which is shown in an unactuated state, may have the same structure as the acoustic element 100 depicted in FIG. 1A.

Figure 3B:
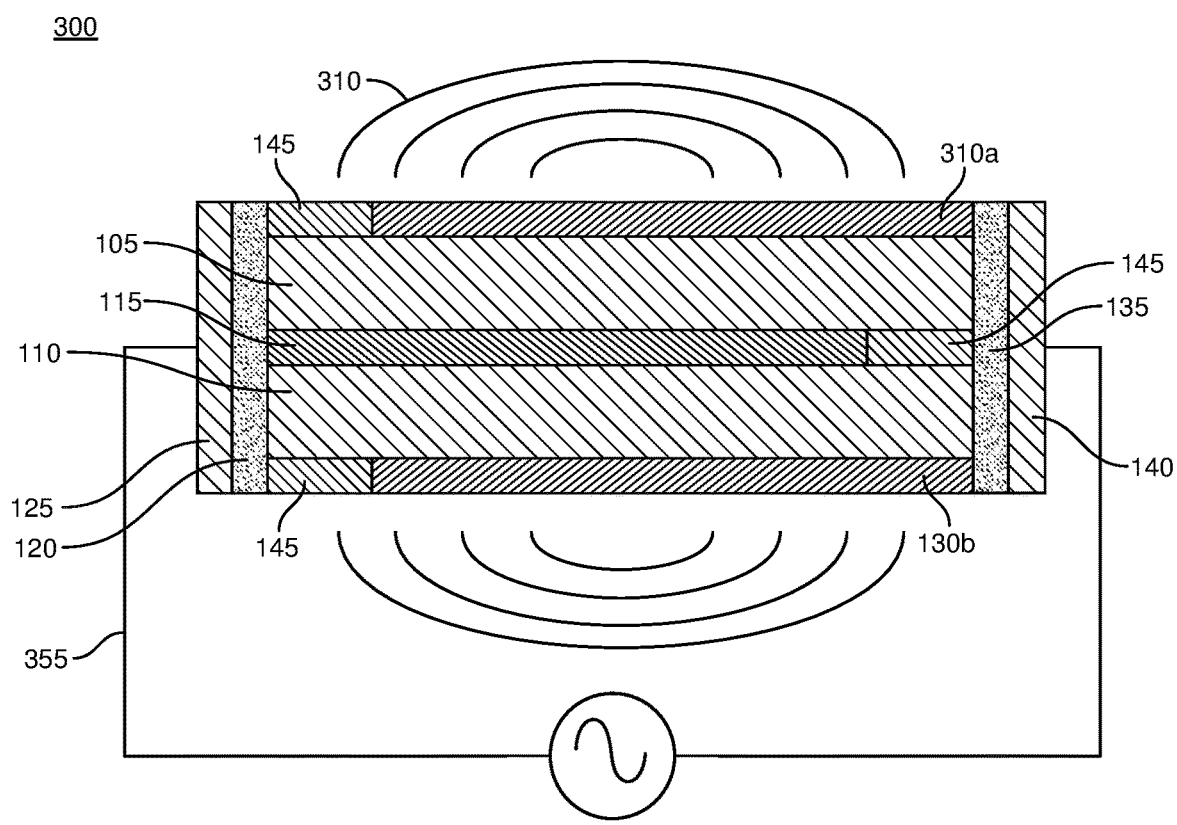
FIG. 3B is a schematic diagram of the nanovoided polymer transducer of FIG. 3A depicting actuation of the transducer and the generation of sound waves according to some embodiments.
Figure 4A:
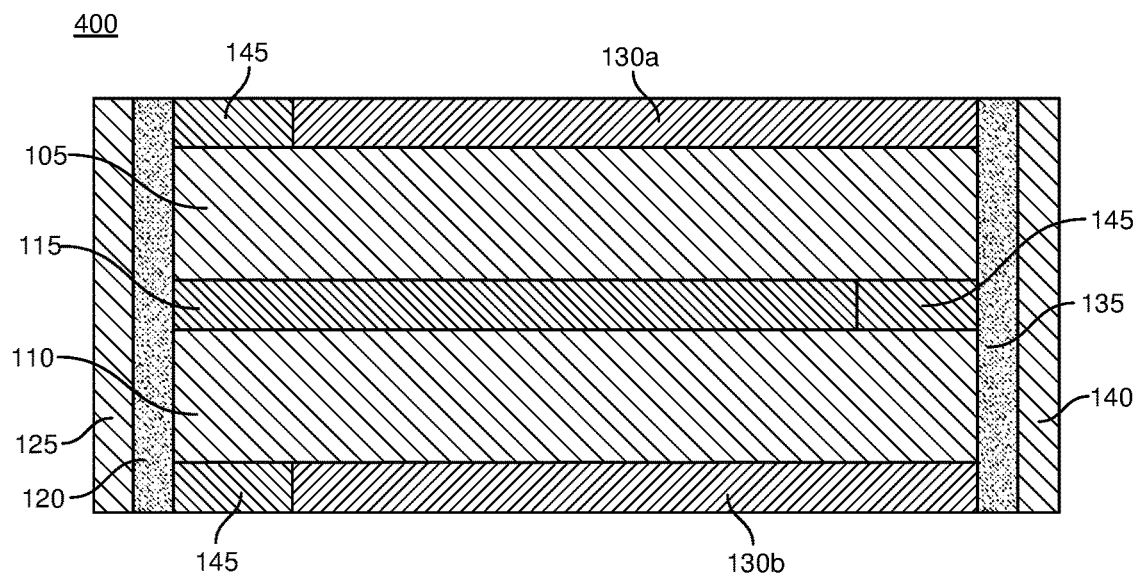
FIG. 4A is a schematic diagram of a nanovoided polymer acoustic sensor according to some embodiments.
Figure 4B:
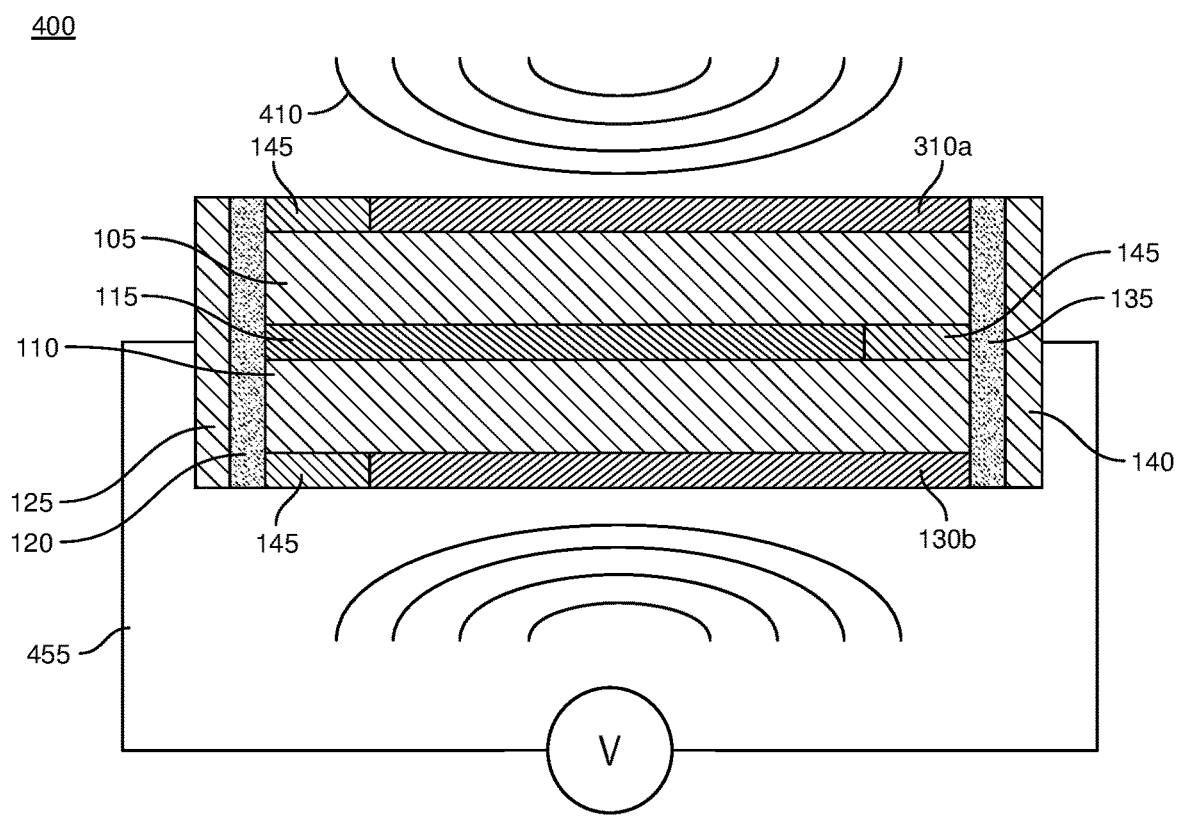
FIG. 4B is an illustration of the nanovoided polymer acoustic sensor of FIG. 4A depicting incoming sound wave-based actuation of the sensor according to certain embodiments.

Referring to FIG. 3B, upon application of an AC electric field 355 to the electrodes, the actuated acoustic element 300 may undergo expansion and contraction. As shown schematically, this periodic strain can be used to generate, as output, a sound field 310. The acoustic element 300 can thus be operated as a transducer of an AC signal into sound waves.

According to further embodiments, a nanovoided polymer-containing acoustic element may operate as a sound wave sensor. Referring to FIG. 4A, such an acoustic element (sensor) 400 is shown in an unactuated state and may have the same structure as the acoustic element 100 depicted in FIG. 1A. With reference to FIG. 4B, incoming sound waves 410 may induce vibrations in the acoustic element 400, which may create compression and/or expansion of the nanovoided polymer layers 105, 110. The induced deformations may be detected as a change in capacitance across the acoustic element 400, which may be measured through circuit 455.

In an example application, a nanovoided polymer-containing acoustic element (e.g., acoustic element 100) may be incorporated into an architectural structure where the acoustic element is disposed over a solid surface thereof, such as an interior or exterior wall. In operation, the acoustic element 100 may decrease the penetration of noise through the wall, i.e., from the outside to the inside, or vice versa. In embodiments where the acoustic element 100 is disposed over an exterior wall, a suitable coating may be formed over the acoustic element 100 to provide protection from the environment.

In a further application, a noise cancellation structure may be formed by co-integrating various acoustic elements. For instance, a device including an acoustic element (sensor) 400 may be configured to register incident sound waves 410, e.g., low frequency sound waves. The device may further include an acoustic element (transducer) 300 configured to emit an output 310 that is amplitude matched but out of phase with the incident sound waves 410. Destructive interference between the output sound waves 310 and the incident sound waves 410 may be used to cancel the incident sound waves. As used herein, sound waves that are "amplitude matched" or that have "substantially equal amplitudes" may include, for example, sound waves having amplitudes that vary by at most 10%, e.g., 0, 2, 4, 6, 8, or 10%, including ranges between any of the foregoing values. As will be appreciated, such a device may include a suitable control unit and real-time hardware.

In some embodiments, sound or undesired noise may be suppressed by sensing sound vibrations and applying a voltage to an acoustic element such that an out-of-phase force is generated to at least partially cancel the undesired noise. Alternatively, a remote sensor may be used to provide information on sound that may reach an acoustic device, and an appropriate voltage waveform may be applied to an acoustic element to at least partially cancel the sensed sound. Alternatively, or in addition, repeating sound vibrations may be identified using, for example, a Fourier frequency analysis, and an appropriate voltage waveform may be applied to an acoustic element to at least partially cancel out the sound vibrations.

In accordance with still further embodiments, plural nanovoided polymer-based acoustic elements may be incorporated into various assemblies, e.g., headphones or window assemblies, including automobile glazings or architectural glazings. In some embodiments, an NVPI/NVPT array may be incorporated into double pane or triple pane glazings. By way of example, an acoustic element array may have a high transparency and may include an acoustic insulator 100 and an acoustic transducer 300, for instance, which may be tuned to provide active noise cancellation. In some embodiments, a triple glazing may be re-engineered as a double glazing by replacing the central glass pane with a transparent, light weight NVPI/NVPT array.

Figure 5:
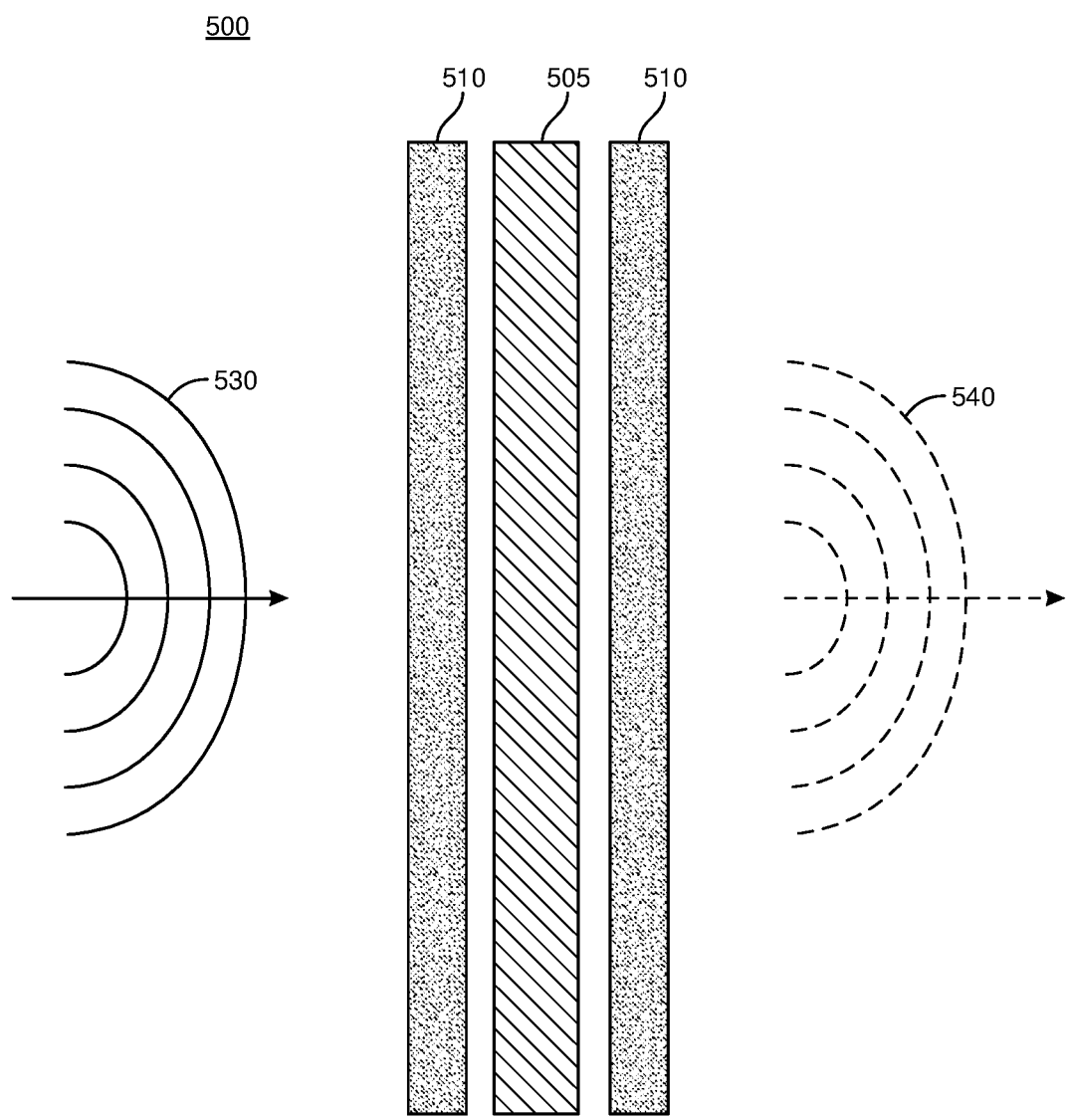
FIG. 5 is a diagram of a window glazing having a nanovoided polymer acoustic insulator/nanovoided polymer transducer composite architecture disposed between inner and outer glass panes according to some embodiments.
Figure 6:
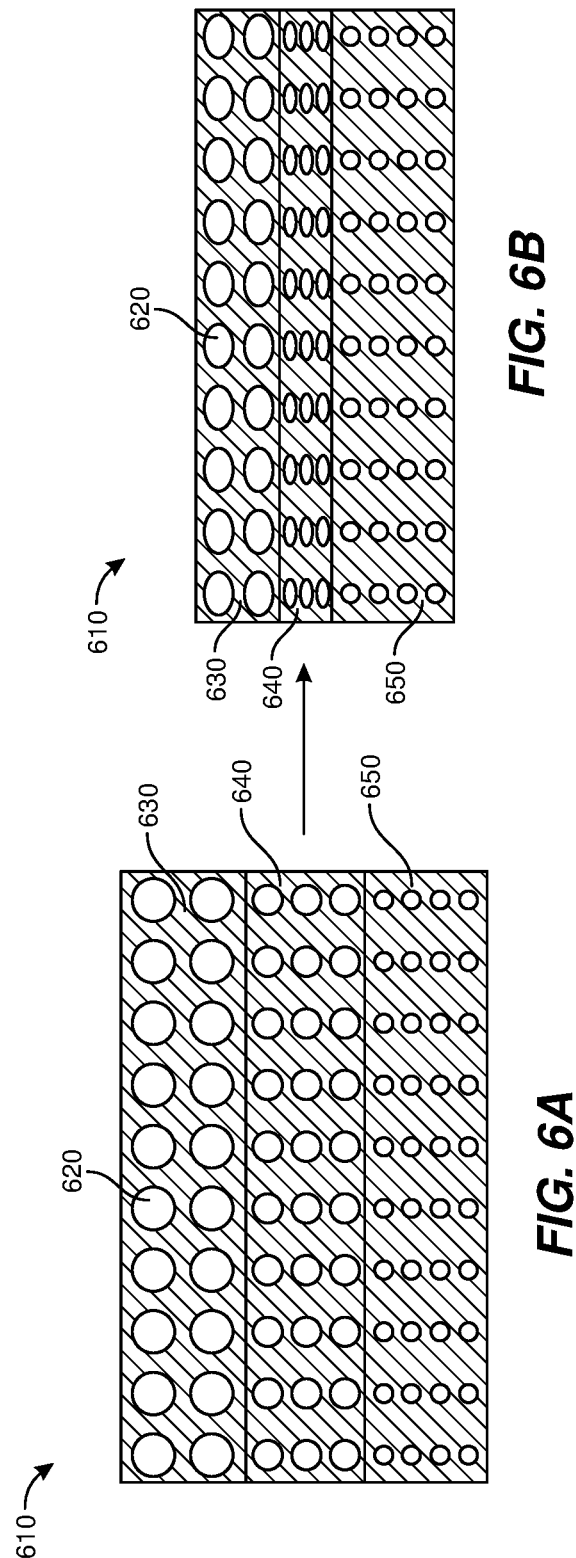
FIG. 6A is a schematic diagram of a nanovoided polymer multilayer structure according to some embodiments.
FIG. 6B is a schematic diagram of the nanovoided polymer multilayer structure of FIG. 6A following actuation of the upper sublayers according to certain embodiments.

Referring to FIG. 5, illustrated is an example double pane glazing 500 having an NVPI/NVPT array 505 incorporated between the inner and outer glass panes 510. The NVPI/NVPT array 505 may attenuate incident sound waves 530 to form transmitted sound waves 540. As will be appreciated, NVPI and NVPT elements may be independently or collectively incorporated into an array.

In some embodiments, reflection from the surface of the nanovoided polymer layers may be decreased by impedance matching the near-surface region (i.e., outwardly-facing portions) of the nanovoided polymer layers to air, and gradually changing the impedance of the nanovoided polymer layers to form a strong acoustic absorber. In this regard, FIG. 6A shows an example nanovoided polymer multilayer structure 610 including, from top to bottom, upper EAP layer 630, middle EAP layer 640, lower EAP layer 650, where structure 610 has a through-thickness gradient in the size of nanovoids 620. As shown in FIG. 6B, actuation of the nanovoided polymer may preferentially induce compression in layers 630, 640, which have a larger average void size. Such a multilayer structure 610 may be fabricated by co-extrusion or using a layer-by-layer method, for example.

Figure 7:
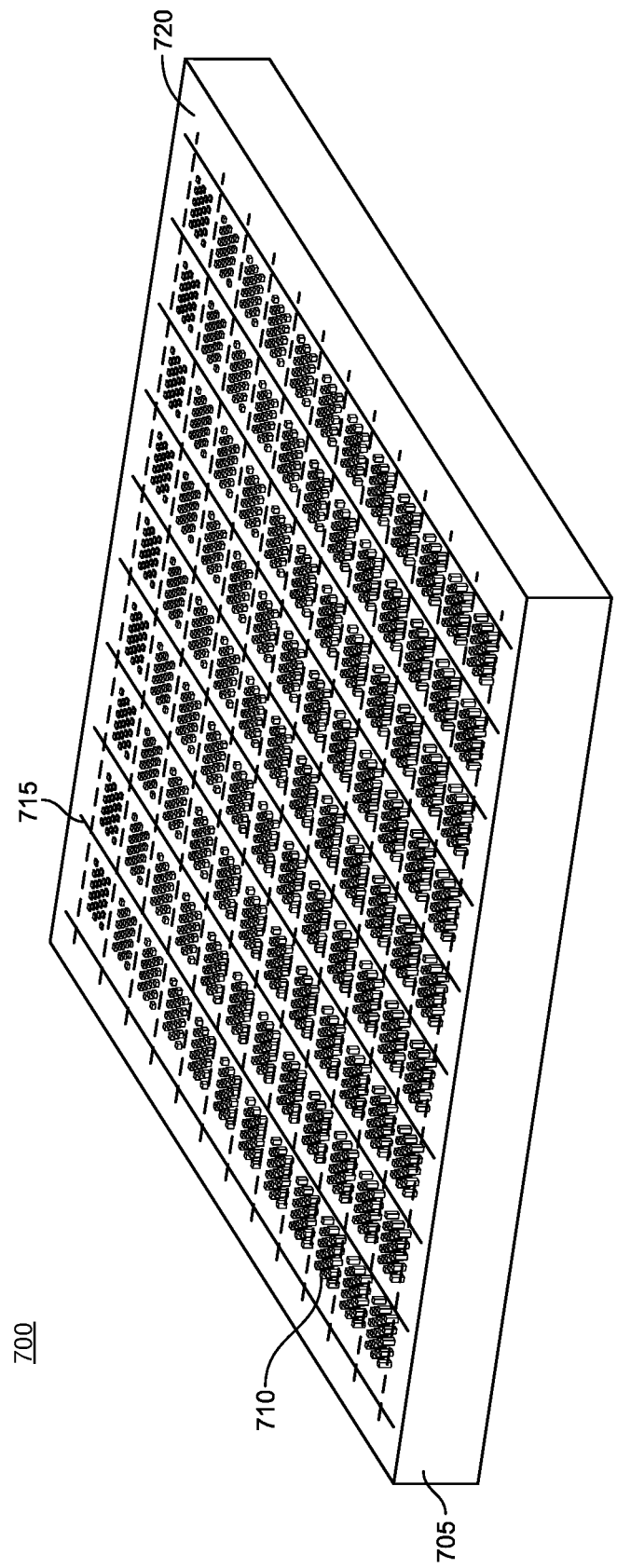
FIG. 7 illustrates an example device having an array of discrete nanovoided polymer insulator and nanovoided polymer transducer elements disposed over a substrate according to some embodiments.

According to further embodiments, and with reference to FIG. 7, a device array 700 of individual NVPI and NVPT elements 710 may be disposed over a substrate 705. Areal dimensions of the elements 710 may range from approximately 0.5 microns×0.5 microns to approximately 15 cm×15 cm. In certain embodiments, the inter-element spacing may be approximately 0.5 microns to approximately 15 cm. Electrical connections 715, 720 may be formed over the substrate 705 to provide electrical communication to the primary and secondary electrodes (not shown).

Although the embodiment illustrated in FIG. 7 depicts a planar substrate 705, NVPI and NVPT elements 710 may be formed over a curved (e.g., concave or convex) substrate. Example substrates 705 include rigid substrates, such as glass, metal, or silicon substrates as well as flexible substrates, such as glass or polymeric substrates, e.g., polyimide or polyethylene substrates.

The methods and systems shown and described herein may be used to form acoustic elements having a single layer or multiple layers of a nanovoided polymer. Each of a plurality of electrode/electroactive polymer layer/electrode stacks, for example, can be independently configured to have a desired void size and void size distribution, as well as shape, alignment, and spacing between layers. Such complex arrangements can enable dynamic, localized control of the insulating or transduction properties of the acoustic element.

In various embodiments, the disclosed acoustic elements may provide a desired degree of sound attenuation, e.g., over a low frequency range (<1000 Hz), in a thin, light weight package. The disclosed acoustic elements, which may provide passive and active noise cancellation, may be used in a variety of environments, including automotive, architectural, aerospace, electronics, etc., in addition to virtual reality, augmented reality and mixed reality devices. That is, a single nanovoided polymer layer or multilayer may be configured to provide both passive and active noise cancellation. Moreover, in certain embodiments, the degree of sound attenuation may be adjusted dynamically.]

In some embodiments, an acoustic element may include a nanovoided polymer layer having an average void size that is less than the wavelength of light incident on the acoustic element. Moreover, an acoustic element containing electrodes may include transparent electrodes. Such acoustic elements may themselves be optically transparent. As used herein, a material or element that is "transparent" or "optically transparent" may, for example, have a transmissivity within the visible light spectrum of at least approximately 50%, e.g., 50, 60, 70, 80, 90, 95, 97, 98, 99, or 99.5%, including ranges between any of the foregoing values, and less than approximately 80% haze, e.g., 1, 2, 5, 10, 20, 3, 40, 50, 60 or 70% haze, including ranges between any of the foregoing values. In accordance with some embodiments, a "fully transparent" material or element has a transmissivity (i.e., optical transmittance) within the visible light spectrum of at least approximately 80%, e.g., 80, 90, 95, 97, 98, 99, or 99.5%, including ranges between any of the foregoing values, and less than approximately 10% haze, e.g., 0, 1, 2, 4, 6, or 8% haze, including ranges between any of the foregoing values.

Disclosed herein is a nanovoided polymer (NVP) material for tunable acoustic damping with integrated active mode operation capability. The NVP material may include a randomly-arranged, nanometer-sized network of pores and can be used for both passive as well as active noise cancellation. The NVP may be an electroactive material that, under the application of an electric field between paired electrodes, starts compressing or expanding in the direction of the field. The change in thickness of the material can be used to tune the attenuation characteristics of the NVP. As the thickness of the material is reduced, the tortuosity of the material reduces, which may decrease the attenuation. Additionally, for an NVP with a low Poisson's ratio, this may lead to a reduction in the surface area of the voids and thus the interaction of the material with the acoustic wave. On the nanoscale, the cell walls separating closed-cell voids may be sufficiently thin that air diffusion happens on a microsecond timescale. A closed-cell voided material can therefore turn into an attenuator for highly-voided material on the nanoscale. In some examples, a plurality of NVP elements may be arrayed on a substrate.

Example Embodiments

Example 1: An acoustic element includes a nanovoided polymer layer, the nanovoided polymer layer having a first nanovoid topology in a first state and a second nanovoid topology different from the first nanovoid topology in a second state.

Example 2: The acoustic element of Example 1, where the first state includes an unactuated state and the second state includes an actuated state.

Example 3: The acoustic element of any of Examples 1 and 2, where the nanovoided polymer layer includes a periodic distribution of nanovoids.

Example 4: The acoustic element of any of Example 1-3, where nanovoids within the nanovoided polymer layer include a gas selected from air, nitrogen, oxygen, argon, sulfur hexafluoride, and an organofluoride.

Example 5: An acoustic insulator including the acoustic element of any of Examples 1-4.

Example 6: The acoustic insulator of Example 5, where the acoustic element is configured to emit sound waves in response to sounds waves incident on the acoustic element.

Example 7: The acoustic insulator of Example 6, where the emitted sound waves and the incident sound waves include an out-of-phase relationship.

Example 8: An acoustic transducer including the acoustic element of any of Examples 1-4.

Example 9: The acoustic transducer of Example 8, where sound waves are produced by applying an AC voltage across the nanovoided polymer.

Example 10: The acoustic transducer of any of Examples 8 and 9, where sound waves incident on a layer of the nanovoided polymer induce a change in capacitance in the nanovoided polymer layer.

Example 11: An acoustic element includes a primary electrode, a secondary electrode overlapping at least a portion of the primary electrode, and a nanovoided polymer layer disposed between and abutting the primary electrode and the secondary electrode, where the nanovoided polymer layer has a first nanovoid topology when a first voltage is applied between the primary electrode and the secondary electrode, and the nanovoided polymer layer has a second nanovoid topology different from the first nanovoid topology when a second voltage different from the first voltage is applied between the primary electrode and the secondary electrode.

Example 12: The acoustic element of Example 11, where sound waves are produced by applying an AC voltage across the nanovoided polymer layer.

Example 13: The acoustic element of any of Example 11 and 12, where sound waves incident on the nanovoided polymer layer induce a change in capacitance in the nanovoided polymer layer.

Example 14: The acoustic element of any of Example 11-13, where the nanovoided polymer layer has a first sound attenuation coefficient when the first voltage is applied between the primary electrode and the secondary electrode and a second sound attenuation coefficient different than the first sound attenuation coefficient when the second voltage is applied between the primary electrode and the secondary electrode.

Example 15: The acoustic element of any of Example 11-14, characterized by an optical transparency within the visible spectrum of at least approximately 50%.

Example 16: A device including an array of acoustic elements, where the acoustic elements include at least one of (a) a plurality of nanovoided polymer-containing acoustic insulators, and (b) a plurality of nanovoided polymer-containing acoustic transducers.

Example 17: The device of Example 16, where a spacing between each acoustic element is from approximately 0.5 µm to approximately 15 cm.

Example 18: The device of any of Examples 16 and 17, where the array of acoustic elements is disposed on a non-planar substrate.

Example 19: The device of any of Examples 16-18, where the array of acoustic elements is disposed on a flexible substrate.

Example 20: The device of any of Examples 16-19, where each acoustic element within the array includes an electrode pair.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 800 in FIG. 8. Other artificial-reality systems may include an NED that also provides visibility into the real world (e.g., augmented-reality system 900 in FIG. 9) or that visually immerses a user in an artificial reality (e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
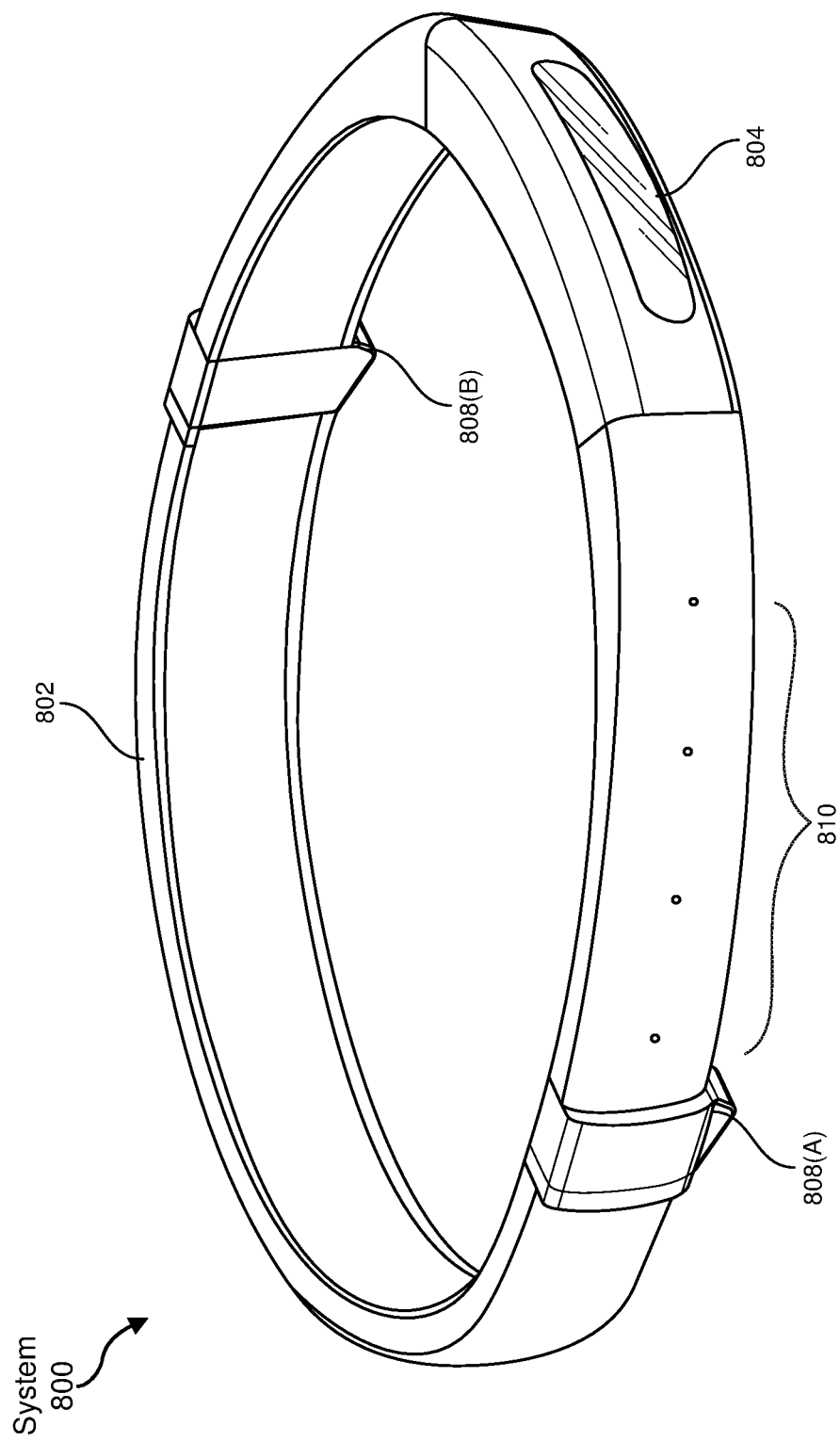
FIG. 8 is an illustration of an exemplary artificial-reality headband that may be used in connection with embodiments of this disclosure.

Turning to FIG. 8, augmented-reality system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. Augmented-reality system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, augmented-reality system 800 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 800 may not include an NED, augmented-reality system 800 may include other types of screens or visual feedback devices (e.g., a display screen integrated into a side of frame 802).

Figure 9:
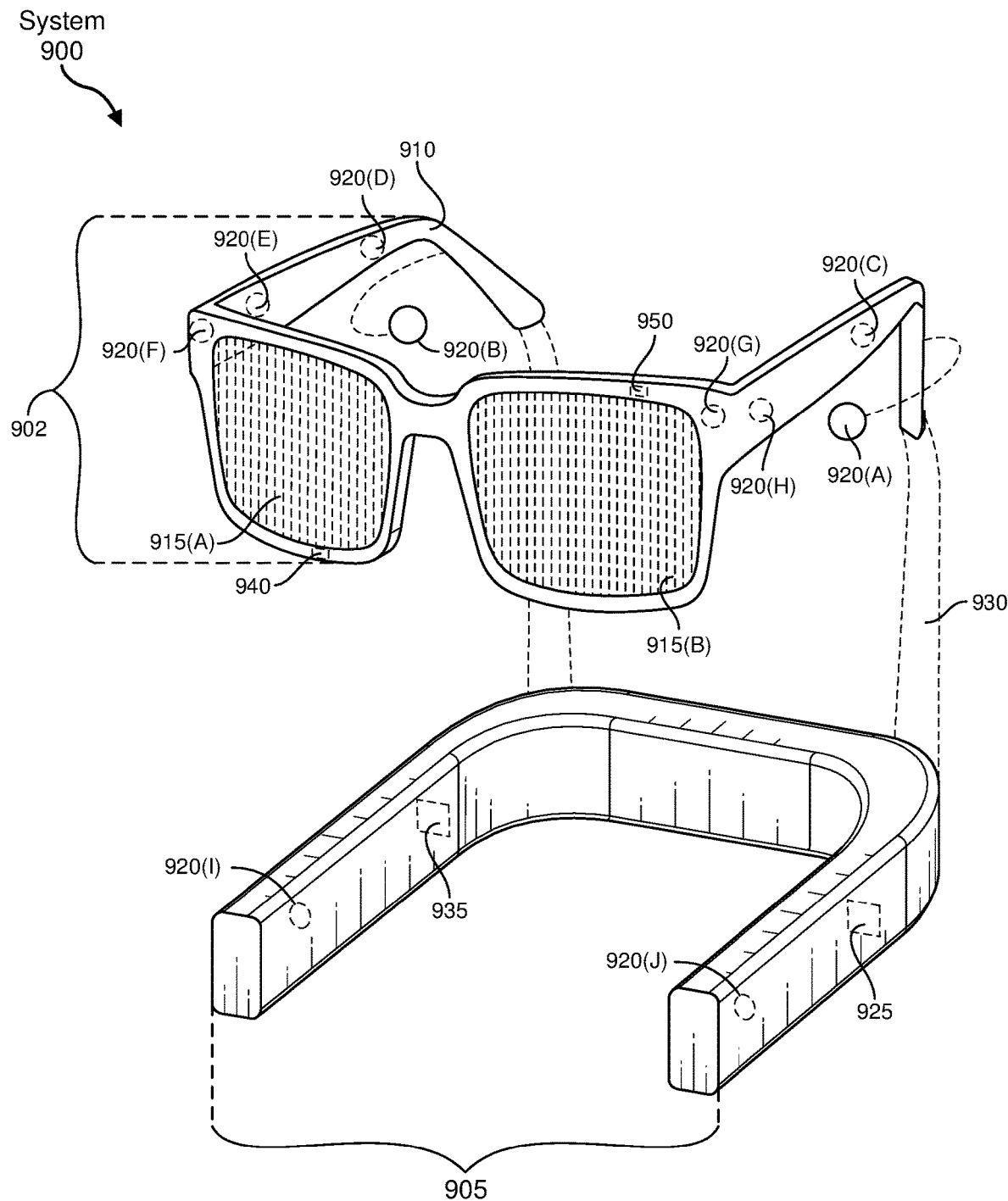
FIG. 9 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent a position sensor, an inertial measurement unit (IMU), a depth camera assembly, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

Augmented-reality system 900 may also include a microphone array with a plurality of acoustic transducers 920(A)-920(J), referred to collectively as acoustic transducers 920. Acoustic transducers 920 may be transducers that detect air pressure variations induced by sound waves. Each acoustic transducer 920 may be configured to detect sound and convert the detected sound into an electronic format (e.g., an analog or digital format). The microphone array in FIG. 2 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments, acoustic transducers 920(A) and 920(B) may be connected to augmented-reality system 900 via a wireless connection (e.g., a Bluetooth connection). In still other embodiments, acoustic transducers 920(A) and 920(B) may not be used at all in conjunction with augmented-reality system 900.

Acoustic transducers 920 on frame 910 may be positioned along the length of the temples, across the bridge, above or below display devices 915(A) and 915(B), or some combination thereof. Acoustic transducers 920 may be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers and other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 800, augmented-reality system 900, and/or virtual-reality system 1000 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
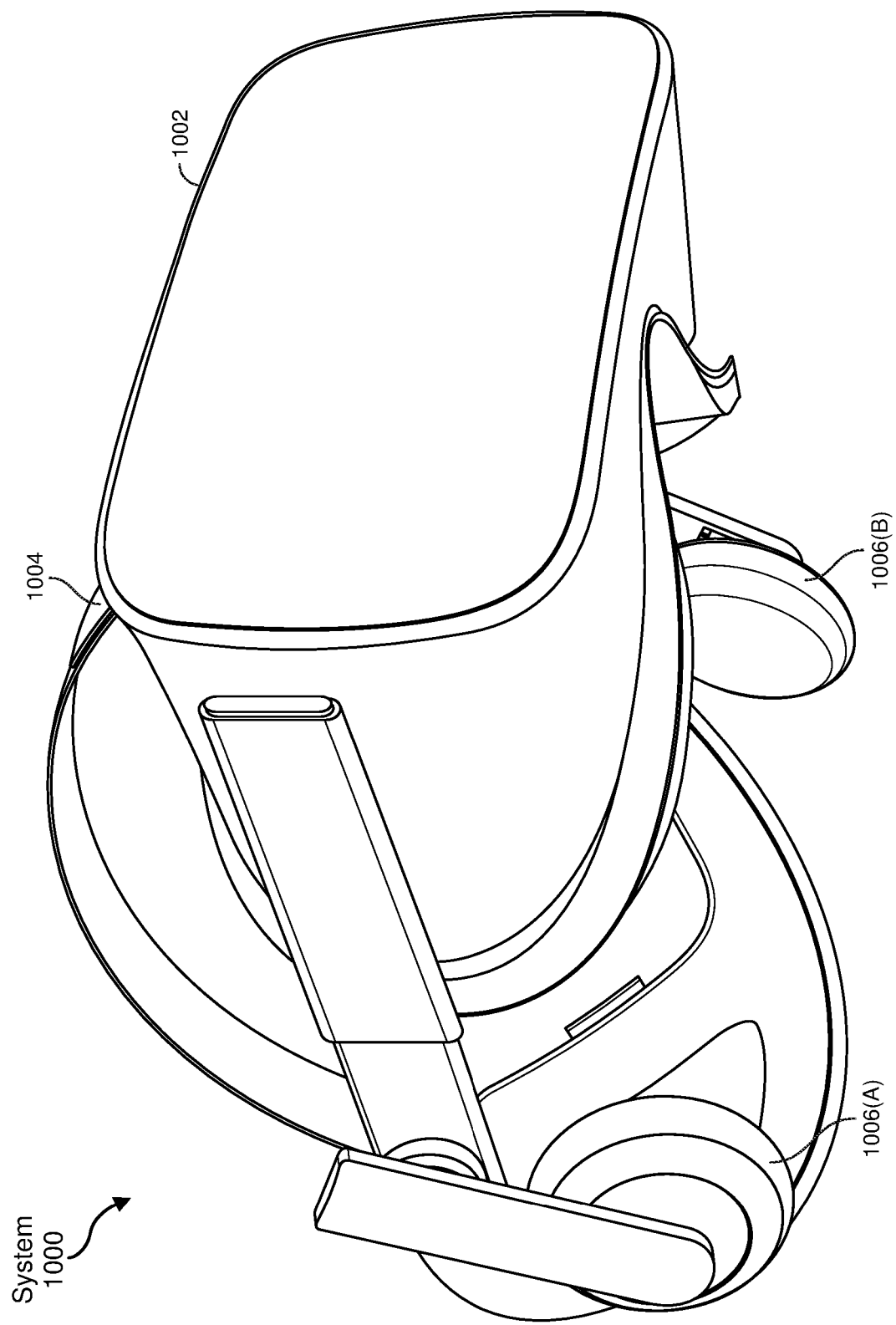
FIG. 10 is an illustration of an exemplary virtual-reality headset that may be used in connection with embodiments of this disclosure.

While not shown in FIGS. 8-10, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 800, 900, and 1000 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
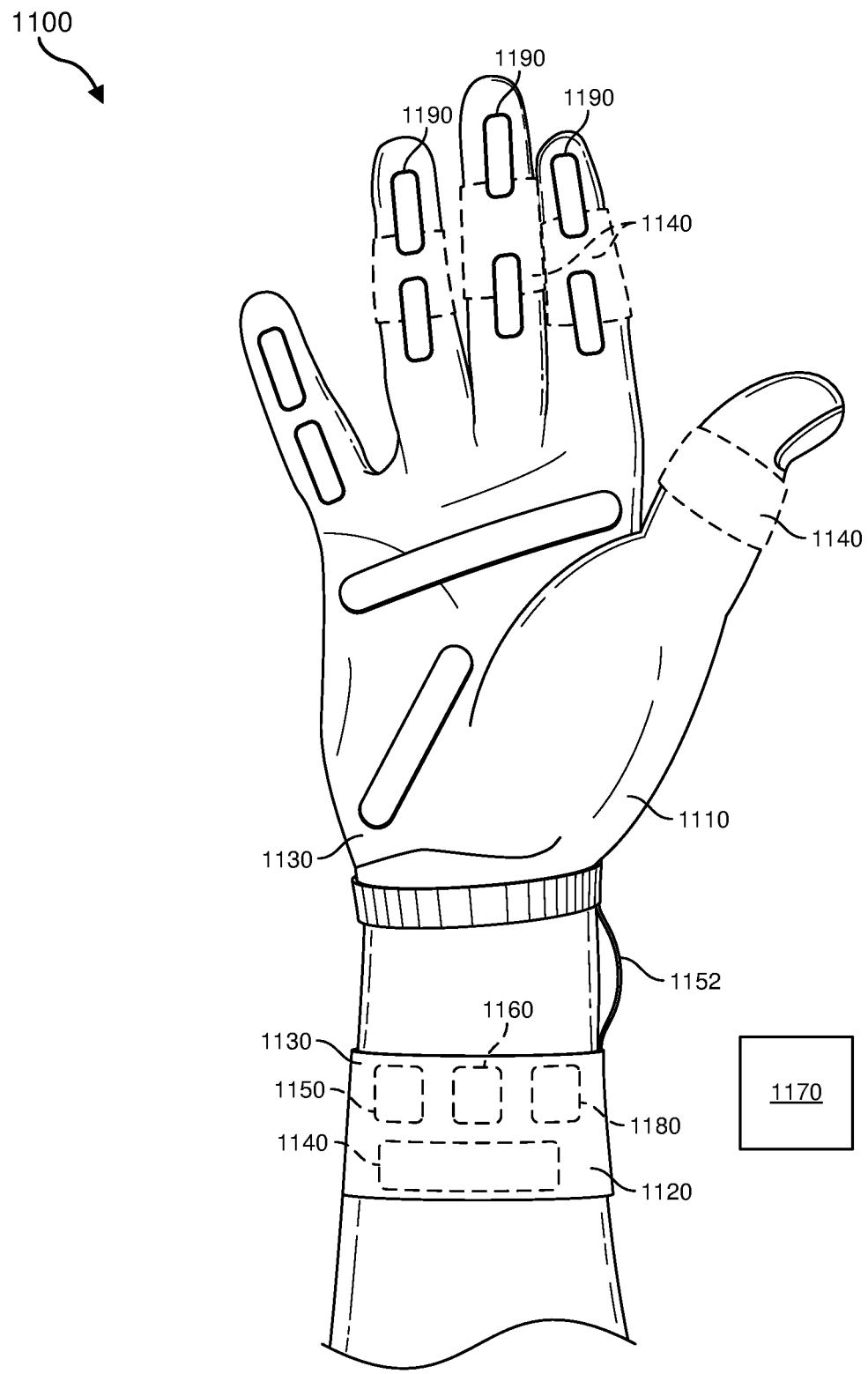
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned to be against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
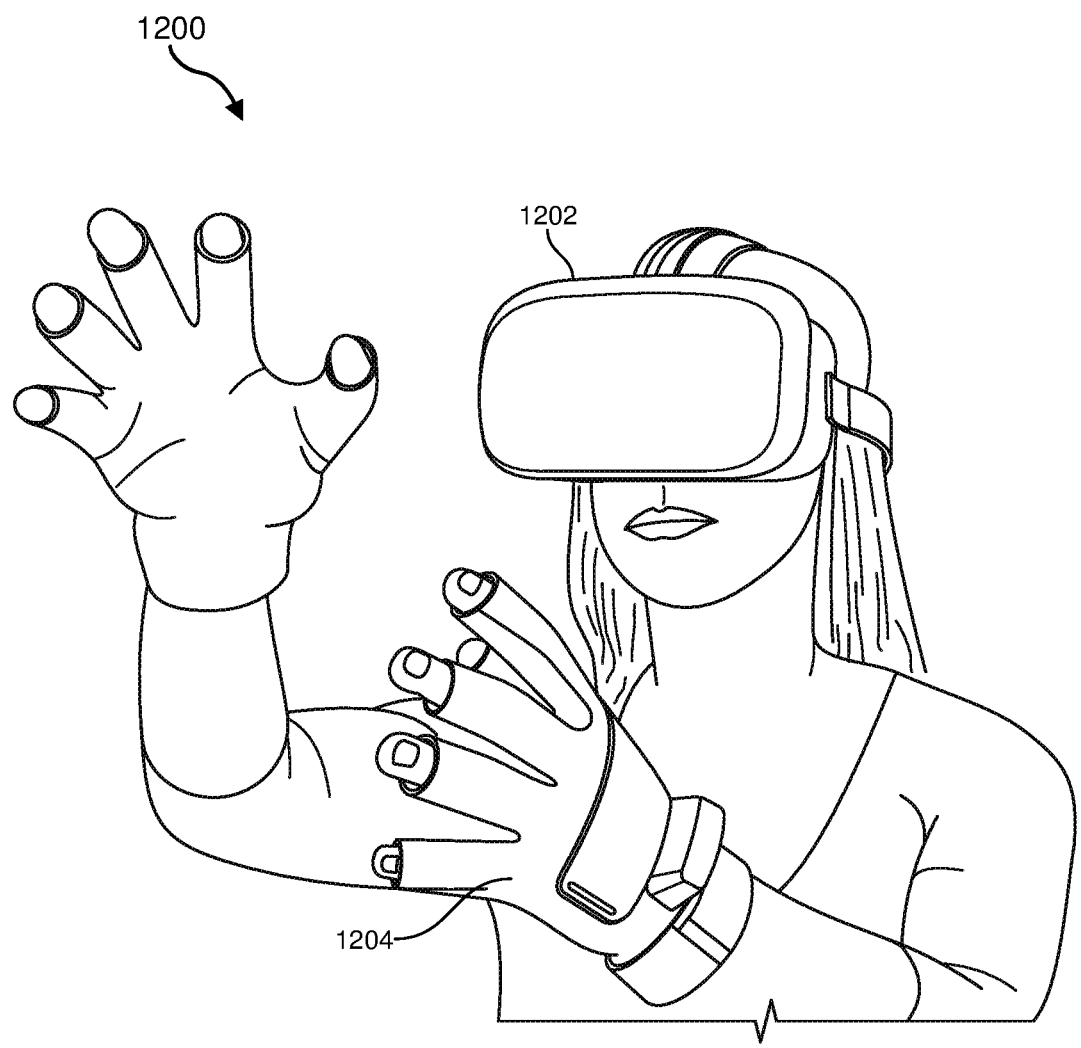
FIG. 12 is an illustration of an exemplary virtual-reality environment according to embodiments of this disclosure.

Haptic wearables, such as those shown in and described in connection with FIG. 11, may be implemented in a variety of types of artificial-reality systems and environments. FIG. 12 shows an example artificial-reality environment 1200 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual-reality system, such as virtual-reality system 1000 in FIG. 10. Haptic device 1204 generally represents any type or form of wearable device, worn by a use of an artificial-reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
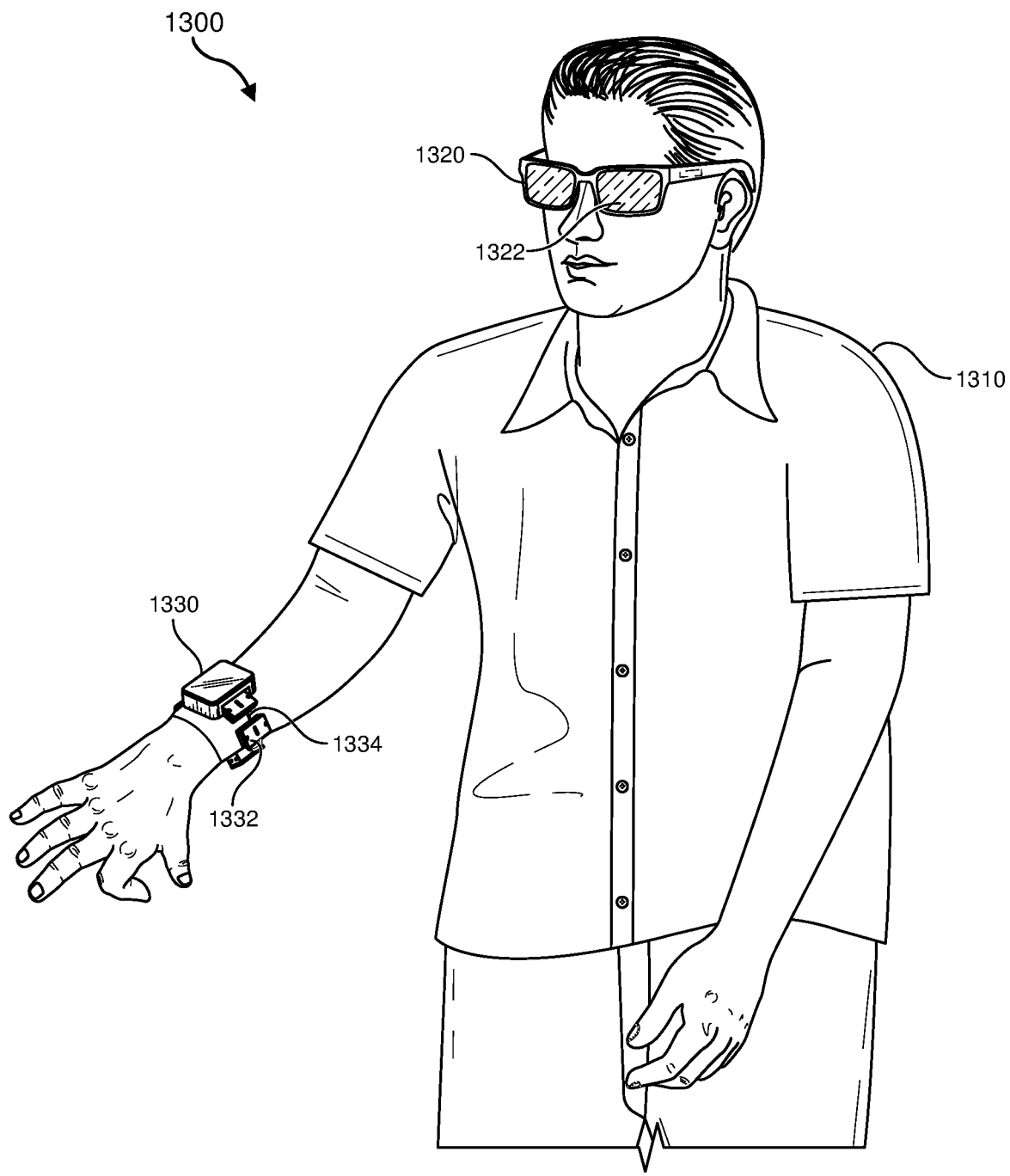
FIG. 13 is an illustration of an exemplary augmented-reality environment according to embodiments of this disclosure.

While haptic interfaces may be used with virtual-reality systems, as shown in FIG. 12, haptic interfaces may also be used with augmented-reality systems, as shown in FIG. 13. FIG. 13 is a perspective view a user 1310 interacting with an augmented-reality system 1300. In this example, user 1310 may wear a pair of augmented-reality glasses 1320 that have one or more displays 1322 and that are paired with a haptic device 1330. Haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In some embodiments, an actuator may include a layer of a shaped electroactive polymer sandwiched between conductive electrodes. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an electrode that comprises or includes aluminum include embodiments where an electrode consists essentially of aluminum and embodiments where an electrode consists of aluminum.

What is claimed is:

1. An acoustic element comprising an electroactive polymer comprising a nanovoided polymer layer, wherein:
    the nanovoided polymer layer comprises a first nanovoid topology in a first state and a second nanovoid topology different from the first nanovoid topology in a second state;
    applying a voltage across the electroactive polymer causes a reversible conformation change between the first nanovoid topology and the second nanovoid topology; and
    the first nanovoid topology attenuates sound waves to a degree that differs from a degree to which the second nanovoid topology attenuates sound waves.

2. The acoustic element of claim 1, wherein the first state comprises an unactuated state and the second state comprises an actuated state.

3. The acoustic element of claim 1, wherein the nanovoided polymer layer comprises a periodic distribution of nanovoids.

4. The acoustic element of claim 1, wherein nanovoids within the nanovoided polymer layer comprise a gas selected from the group consisting of air, nitrogen, oxygen, argon, sulfur hexafluoride, and an organofluoride.

5. An acoustic insulator comprising the acoustic element of claim 1.

6. The acoustic insulator of claim 5, wherein the acoustic element is configured to emit sound waves in response to sounds waves incident on the acoustic element.

7. The acoustic insulator of claim 6, wherein the emitted sound waves and the incident sound waves comprise an out-of-phase relationship.

8. An acoustic transducer comprising the acoustic element of claim 1.

9. The acoustic transducer of claim 8, wherein sound waves are produced by applying an AC voltage across the nanovoided polymer.

10. The acoustic transducer of claim 8, wherein sound waves incident on a layer of the nanovoided polymer induce a change in capacitance in the nanovoided polymer layer.

11. An acoustic element, comprising:
    a primary electrode;
    a secondary electrode overlapping at least a portion of the primary electrode; and
    a nanovoided polymer layer disposed between and abutting the primary electrode and the secondary electrode, wherein:
    the nanovoided polymer layer has a first nanovoid topology when a first voltage is applied between the primary electrode and the secondary electrode,
    the nanovoided polymer layer has a second nanovoid topology different from the first nanovoid topology when a second voltage different from the first voltage is applied between the primary electrode and the secondary electrode; and
    the first nanovoid topology attenuates sound waves to a degree that differs from a degree to which the second nanovoid topology attenuates sound waves.

12. The acoustic element of claim 11, wherein sound waves are produced by applying an AC voltage across the nanovoided polymer layer.

13. The acoustic element of claim 11, wherein sound waves incident on the nanovoided polymer layer induce a change in capacitance in the nanovoided polymer layer.

14. The acoustic element of claim 11, wherein the nanovoided polymer layer has a first sound attenuation coefficient when the first voltage is applied between the primary electrode and the secondary electrode and a second sound attenuation coefficient different than the first sound attenuation coefficient when the second voltage is applied between the primary electrode and the secondary electrode.

15. The acoustic element of claim 11, characterized by an optical transparency within the visible spectrum of at least approximately 50%.

16. A device comprising an array of acoustic elements, where the acoustic elements comprise at least one of:
    (i) a plurality of nanovoided polymer-containing acoustic insulators, and
    (ii) a plurality of nanovoided polymer-containing acoustic transducers;
    wherein at least one of the acoustic elements comprises an electroactive polymer comprising a nanovoided polymer layer, wherein:
    the nanovoided polymer layer comprises a first nanovoid topology in a first state and a second nanovoid topology different from the first nanovoid topology in a second state;
    applying a voltage across the electroactive polymer causes a reversible conformation change between the first nanovoid topology and the second nanovoid topology; and
    the first nanovoid topology attenuates sound waves to a degree that differs from a degree to which the second nanovoid topology attenuates sound waves.

17. The device of claim 16, wherein a spacing between each acoustic element is from approximately 0.5 µm to approximately 15 cm.

18. The device of claim 16, wherein the array of acoustic elements is disposed on a non-planar substrate.

19. The device of claim 16, wherein the array of acoustic elements is disposed on a flexible substrate.

20. The device of claim 16, wherein each acoustic element within the array comprises an electrode pair.

* * * * *